United States Patent
Whiteside

(10) Patent No.: US 9,902,630 B2
(45) Date of Patent: Feb. 27, 2018

(54) APPARATUS AND METHOD FOR LIQUID PUMPING

(71) Applicant: Coldharbour Marine Limited, Alfreton (GB)

(72) Inventor: Richard Eric Whiteside, Alfreton (GB)

(73) Assignee: Coldharbour Marine Limited, Alfreton, Derbyshire (GB)

(*) Notice: Subject to any disclaimer, the term of this patent is extended or adjusted under 35 U.S.C. 154(b) by 862 days.

(21) Appl. No.: 14/367,615

(22) PCT Filed: Dec. 24, 2012

(86) PCT No.: PCT/GB2012/053270
§ 371 (c)(1),
(2) Date: Jun. 20, 2014

(87) PCT Pub. No.: WO2013/093527
PCT Pub. Date: Jun. 27, 2013

(65) Prior Publication Data
US 2015/0315047 A1    Nov. 5, 2015

(30) Foreign Application Priority Data
Dec. 22, 2011   (GB) .................................. 1122211.4

(51) Int. Cl.
*C02F 1/36*   (2006.01)
*C02F 1/72*   (2006.01)
(Continued)

(52) U.S. Cl.
CPC ............ *C02F 1/72* (2013.01); *B01F 3/04106* (2013.01); *B01F 3/04439* (2013.01);
(Continued)

(58) Field of Classification Search
CPC .... F04F 1/18; F04F 5/26; B63B 13/00; B63B 39/03; C02F 1/72; C02F 1/36;
(Continued)

(56) References Cited

U.S. PATENT DOCUMENTS

| 347,196 A | 8/1886 | Pohle |
| 1,054,629 A | 2/1913 | Warwick |

(Continued)

FOREIGN PATENT DOCUMENTS

| CH | 637 034 A5 | 7/1983 |
| CN | 87100504 A | 8/1987 |

(Continued)

OTHER PUBLICATIONS

Munding, Machine Translation of DE19700202, 1998, 15 pages.
(Continued)

*Primary Examiner* — Walter D Griffin
*Assistant Examiner* — Cameron Allen
(74) *Attorney, Agent, or Firm* — Myers Bigel, P.A.

(57) ABSTRACT

It is to be understood that embodiments of the present invention provide apparatus and a method for pumping a liquid, for example to recirculate liquid in a liquid storage tank by means of a gas lift pump. A perforated extension at the top of a gas lift allows the apparatus to be used in circumstances where the depth of liquid in the tank may vary over a wide range. Gases other than air may be used in the gas lift, so as to change the acidity and the concentrations of dissolved gases, particularly oxygen, in the liquid. The gas may be introduced into the gas lift through a whistle that generates intense sound waves and couples them into the liquid. These features when used in combination have particular application against invasive species in the ballast water of ocean-going tankers.

25 Claims, 24 Drawing Sheets

(51) Int. Cl.
*B01F 3/04* (2006.01)
*B01F 11/02* (2006.01)
*B01F 5/04* (2006.01)
*B63B 39/03* (2006.01)
*F04F 1/18* (2006.01)
*B63B 13/00* (2006.01)
*F04F 5/26* (2006.01)

(52) U.S. Cl.
CPC ............ *B01F 5/0413* (2013.01); *B01F 11/02* (2013.01); *B63B 13/00* (2013.01); *B63B 39/03* (2013.01); *C02F 1/36* (2013.01); *F04F 1/18* (2013.01); *F04F 5/26* (2013.01); *B01F 2215/008* (2013.01); *C02F 2303/04* (2013.01); *C02F 2307/00* (2013.01)

(58) Field of Classification Search
CPC .............. C02F 2303/04; C02F 2307/00; B01F 3/04439; B01F 3/04106; B01F 11/02; B01F 5/0413; B01F 2215/008
See application file for complete search history.

(56) References Cited

U.S. PATENT DOCUMENTS

| | | | |
|---|---|---|---|
| 1,604,419 A | 6/1923 | Oliphant | |
| 1,698,619 A | 1/1929 | Blow | |
| 1,712,695 A | 5/1929 | Engstrand | |
| 2,632,513 A | 3/1953 | Bennett | |
| 3,172,370 A | 3/1965 | Hoff | |
| 3,230,923 A | 1/1966 | Hughes | |
| 3,393,519 A | 7/1968 | Mitchell | |
| 3,427,989 A | 2/1969 | Bostock et al. | |
| 3,433,174 A | 3/1969 | Chenoweth | |
| 3,694,106 A | 9/1972 | Walker | |
| 4,408,719 A | 10/1983 | Last | |
| 5,326,468 A * | 7/1994 | Cox | B01F 5/0646 138/45 |
| 5,735,600 A | 4/1998 | Wyness et al. | |
| 6,221,260 B1 | 4/2001 | Chahine | |
| 6,402,965 B1 | 6/2002 | Sullivan et al. | |
| 6,540,922 B1 * | 4/2003 | Cordemans | A61K 41/0014 210/167.01 |
| 6,770,248 B2 * | 8/2004 | Haggett | A61L 2/025 134/184 |
| 6,821,442 B1 | 11/2004 | Watten | |
| 2002/0174814 A1 | 11/2002 | Hunter | |
| 2003/0132165 A1 | 7/2003 | De Meulenaer et al. | |
| 2005/0006313 A1 | 1/2005 | Swinnen et al. | |
| 2006/0118495 A1 | 6/2006 | Kondratalv | |
| 2009/0145595 A1 * | 6/2009 | Mazzanti | E21B 17/18 166/106 |
| 2011/0306931 A1 * | 12/2011 | Kamen | G05D 7/0647 604/151 |

FOREIGN PATENT DOCUMENTS

| | | |
|---|---|---|
| CN | 101792692 A | 8/2010 |
| DE | 4037899 A1 | 6/1992 |
| DE | 19700202 A1 | 7/1998 |
| DE | 102004042984 A1 | 3/2006 |
| EP | 0232000 A1 | 8/1987 |
| EP | 0442454 A1 | 8/1991 |
| EP | 0 963 784 A1 | 12/1999 |
| FR | 2 809 179 A1 | 11/2001 |
| GB | 150698 | 8/1919 |
| GB | 624385 A | 6/1949 |
| GB | 1063388 | 8/1964 |
| GB | 1063860 A | 3/1967 |
| GB | 1241377 | 5/1969 |
| GB | 2470070 A | 10/2010 |
| JP | S50125718 A | 10/1975 |
| JP | S5489366 A | 7/1979 |
| JP | 56114897 | 9/1981 |
| JP | S60227887 | 11/1985 |
| JP | S6245398 A | 2/1987 |
| JP | 1310200 A | 12/1989 |
| JP | 2090982 A | 3/1990 |
| JP | H04026100 U | 3/1992 |
| JP | H06134347 A | 5/1994 |
| JP | H06277690 A | 10/1994 |
| JP | 2000000447 A | 1/2000 |
| JP | 2000205200 A | 7/2000 |
| JP | 2000240600 A | 9/2000 |
| JP | 2000516522 A | 12/2000 |
| JP | 2003049800 A | 2/2003 |
| JP | 2004237144 A | 8/2004 |
| JP | 2005291171 A | 10/2005 |
| JP | 2006043674 A | 2/2006 |
| JP | 2006136819 | 6/2006 |
| JP | 2007113295 A | 5/2007 |
| JP | 2007515289 A | 6/2007 |
| JP | 2007229577 A | 9/2007 |
| JP | 2008520473 A | 6/2008 |
| JP | 2009022941 A | 2/2009 |
| JP | 2009056442 A | 3/2009 |
| JP | 2009513333 A | 4/2009 |
| JP | 2009-131827 A | 6/2009 |
| JP | 2010000490 A | 1/2010 |
| JP | 2010036148 A | 2/2010 |
| JP | 2011072982 A | 4/2011 |
| RU | 2248469 C1 | 3/2005 |
| SU | 500379 A1 | 1/1976 |
| WO | WO 2005/005322 A | 1/2005 |
| WO | WO 2005/061394 A1 | 7/2005 |
| WO | WO 2006/080969 A1 | 8/2006 |
| WO | WO 2007/049139 A1 | 5/2007 |
| WO | WO 2007/049139 A2 | 5/2007 |
| WO | WO 2010/128336 A1 | 11/2010 |
| WO | WO 2012/001415 A1 | 1/2012 |

OTHER PUBLICATIONS

"What is amplitude?", downloaded Jul. 21, 2017 from http://www.indiana.edu/~emusic/acoustics/amplitude.htm, 6 pp.

Patents Act 1977: Examination Report under Section 18(3), UK IPO Application No. GB1411447.4, dated Aug. 2, 2017, 5 pp.

* cited by examiner

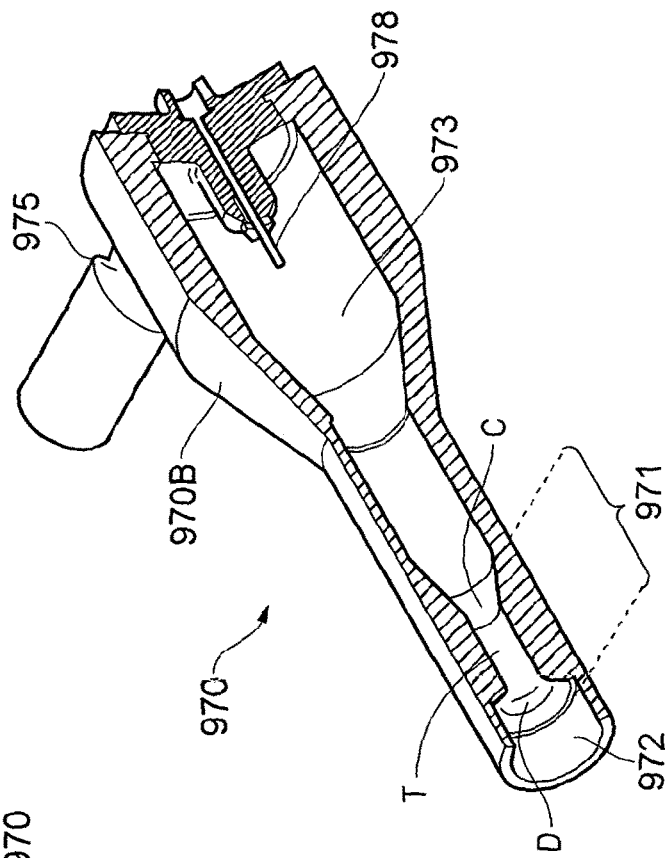
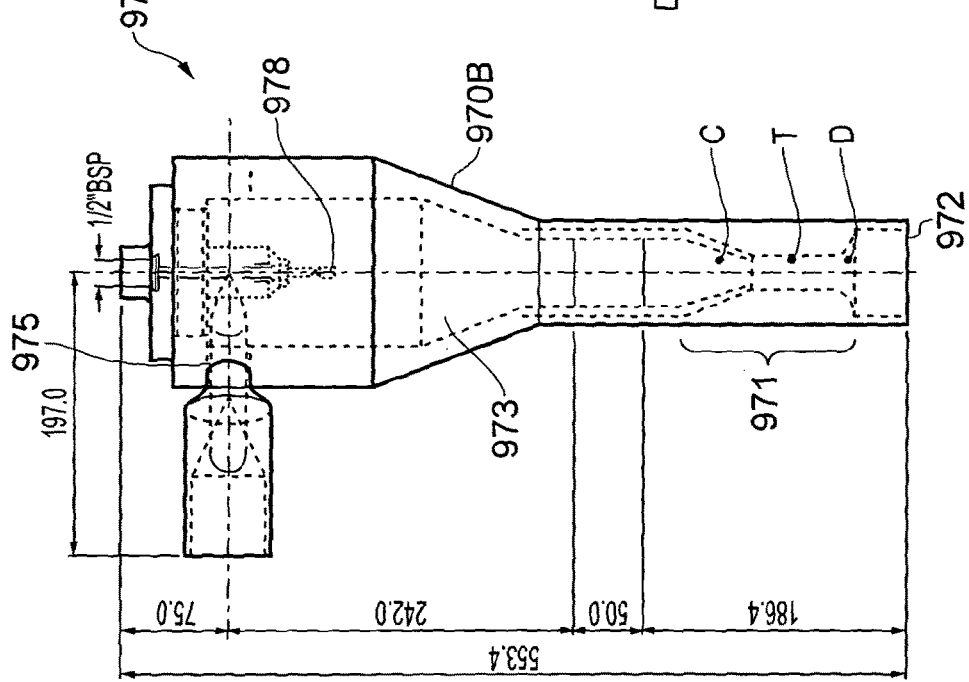

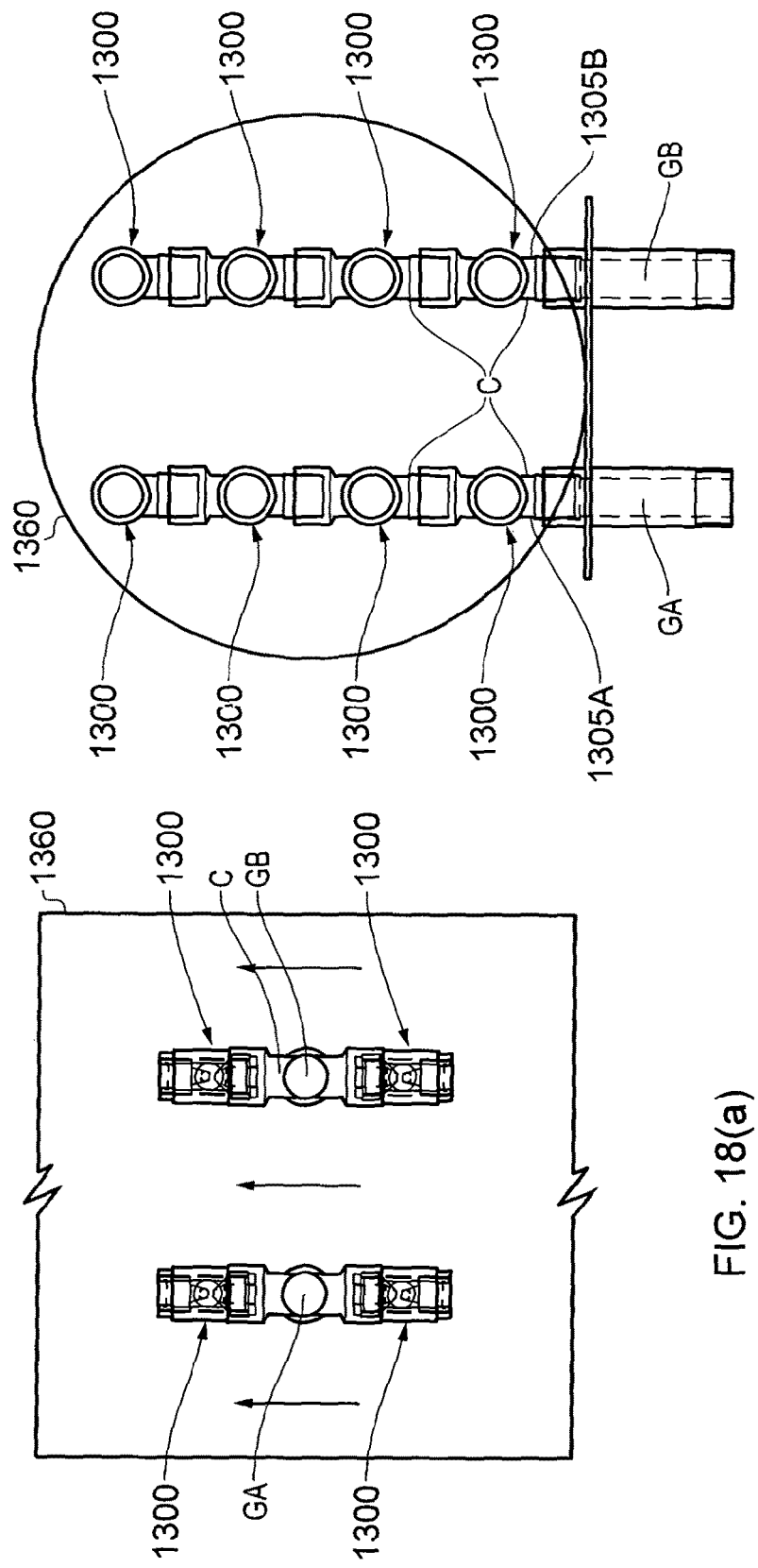

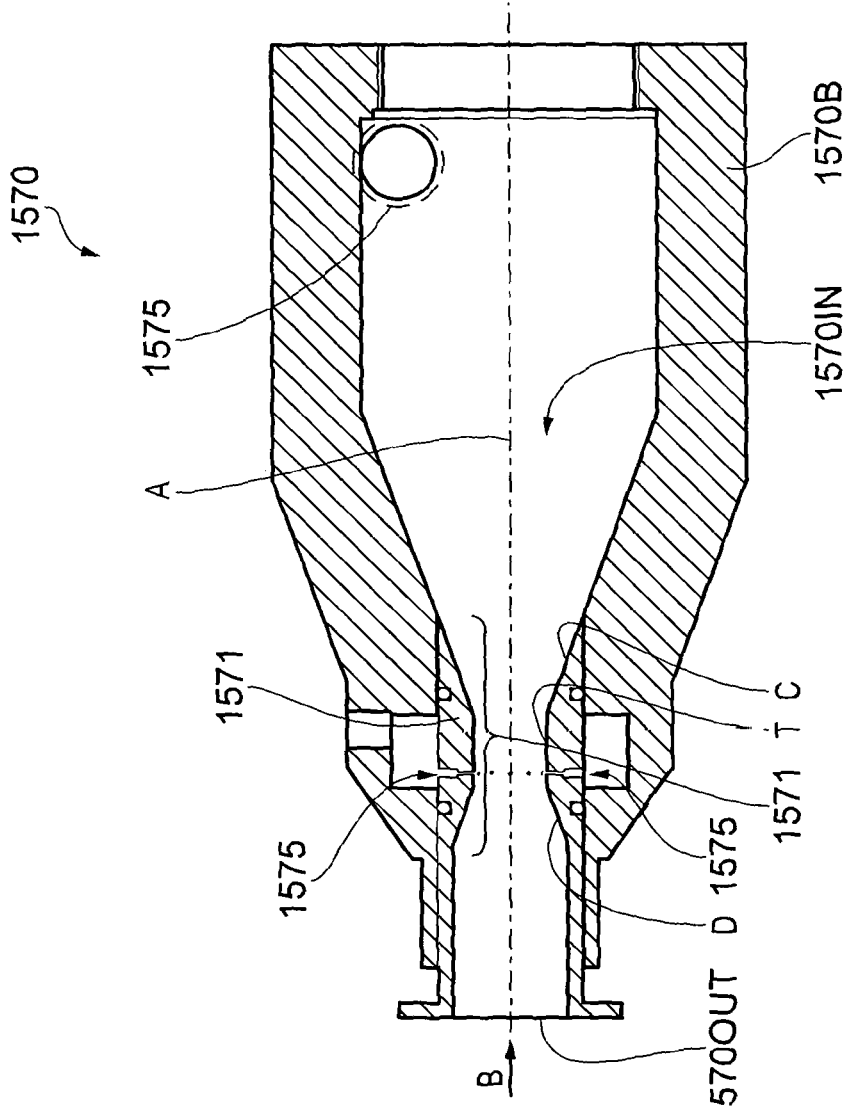
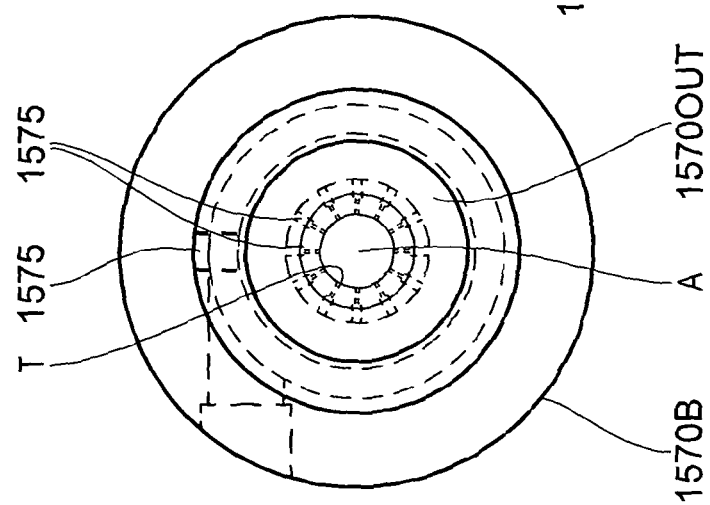
FIG. 21(a)
FIG. 21(b)

APPARATUS AND METHOD FOR LIQUID PUMPING

RELATED APPLICATIONS

This application is a 35 U.S.C. § 371 national stage application of PCT Application No. PCT/GB2012/053270, filed on Dec. 24, 2012, which claims priority from Great Britain Patent Application No. 1122211.4, filed Dec. 22, 2011, the contents of which are incorporated herein by reference in their entireties. The above-referenced PCT International Application was published in the English language as International Publication No. WO 2013/093527 A1 on Jun. 27, 2013.

FIELD OF THE INVENTION

The present invention relates to gas lift pump apparatus and to a method of pumping liquid by gas lift. In particular but not exclusively some embodiments of the present invention relate to circulation of liquid in a liquid storage tank.

BACKGROUND

The problem exists that aquatic nuisance species (ANS) such as Zebra mussels are being transported between locations such as between ports of different countries in the ballast tanks of maritime vessels. Aquatic nuisance species may be defined as waterborne, non-native organisms that threaten the diversity or abundance of native species, the ecological stability of impacted waters or commercial, agricultural, aquacultural or recreational activities. A variety of measures for preventing invasion of an environment by ANS have been proposed, including purging of ballast tanks at sea before a vessel enters an area sensitive to ANS.

However, purging of a ballast tank requires emptying and refilling of the ballast tank. It will be understood that such a procedure can have an adverse effect on the stability of a vessel particularly in rough seas and is not appropriate in certain cases.

STATEMENT OF THE INVENTION

Aspects of the invention provide an apparatus and a method as claimed in the appended claims.

According to another aspect of the invention for which protection is sought, there is provided gas lift pump apparatus comprising:
 a column having in use a substantially upright portion through which a liquid medium may be pumped by gas lift; and
 a fluid delivery device for delivering a flow of a gaseous fluid into the column at a first location of the column, wherein the column comprises a lift portion having a substantially continuous, unperforated wall and a perforated portion being a portion having a perforated wall, the fluid delivery device being operable to deliver the flow of gaseous fluid into the lift portion wherein the gaseous fluid rises through the lift portion a first distance before entering the perforated portion.

By perforated wall is meant that the wall has at least one aperture formed therein. Advantageously the perforated portion has a plurality of apertures formed in the wall thereof.

Embodiments of the invention have the advantage that liquid medium may be recirculated in a liquid storage tank by means of the apparatus even if a level of liquid in the storage tank fluctuates in depth over a wide range of depths. This is because liquid being pumped through the column may pass out from the column through perforations in the perforated portion of the column if the column is not itself fully immersed in the liquid. Thus liquid is not required to travel to a free (upper) end of the column before exiting the column, but can exit the column laterally through a wall of the column by means of the perforations.

In some arrangements the apparatus is operable to deliver a flow of gaseous fluid into the column only at the first location. In other words, there are no other locations at which gaseous fluid is injected into the column. In some embodiments a plurality of fluid delivering devices may each deliver a flow of gaseous fluid into the column substantially at the first location. In some alternative arrangements gaseous fluid may be injected at one or more locations along a length of the column in addition to the first location.

The feature that the gaseous fluid is injected into the lift portion allows the apparatus to establish pumping of liquid through the column before gas enters the perforated portion of the column where the differential pressure between liquid in the column and liquid external to the column is reduced.

It is to be understood that embodiments of the invention have the unexpected advantage that, once pumping of liquid through the column is established, gas injected into the column becomes entrained in the upward flow of liquid and the liquid in the column tends to remain in the column as it rises upwardly. This is because a head of pressure to which liquid in the column is subject is less than that of liquid outside the column, due to the presence of gas bubbles in the liquid reducing a mass of the column of liquid. Accordingly, entrained gas tends to remain within the column where it is also subject to a lower pressure.

Any gas that does escape from the column through the perforations therein may be drawn back into the column due to the adverse pressure gradient established between liquid on an inside of the column and liquid external to the column. Some of the gas that escapes from the column may become trapped in a boundary region or boundary layer surrounding the column and rises within this boundary region to a surface of the liquid.

The liquid (and entrained gas) tend to rise within the column and exit the column at or close to a surface of the liquid through the perforations in the sidewall. If the column is fully submerged the liquid with entrained gas may exit the column at a free end of the column without having to pass through the sidewall.

Advantageously an axial distance of the first location of the column from the perforated portion of the column may be a distance greater than or substantially equal to substantially ten times an average diameter of the column at the first location.

Optionally an axial distance of the first location of the column from the perforated portion of the column corresponds to a multiple of the average diameter of the column at the first location, the multiple being one selected from amongst from 10 to 15, from 15 to 20 and more than 20 diameters.

Advantageously the apparatus may further comprise a sonic energy generator, the generator being operable to launch sonic energy into a liquid medium flowing through the column.

It is to be understood that by the term 'launch' is meant that the generator is operable to transmit the sonic energy into the liquid medium. Thus the sonic energy generator may launch sonic energy (sound waves) into the liquid medium. The device itself may generate sonic shockwaves. In addition or instead the device may generate sonic waves that are not shockwaves. Sound waves launched into the liquid medium may be ordinary sound waves and not shockwaves.

The sonic energy generator may be provided by or be additional to the fluid delivery device.

The sonic generator may be arranged to generator sonic waves with a fundamental frequency in the range 20-50 kHz, optionally in the range 20-25 kHz. In some embodiments the sonic generator may be arranged to generator sonic waves with a fundamental frequency of around 22 kHz. The waves may be generated with overtones at 44 and 88 kHz. Other arrangements are also useful.

The advantage of this feature is that the sonic generator may cause collapse of gas bubbles present in the liquid medium. This may result in the destruction of aquatic nuisance species which may for example be attached to a wall of the bubbles, for example bacterial ANS. The apparatus may be operable to adjust a sonic frequency of sonic energy generated by the generator.

In embodiments in which sonic energy is obtained at a resonant frequency associated with the generator, the apparatus may be operable to adjust the resonant frequency.

Advantageously the sonic energy generator may comprise a nozzle member operable to direct a flow of gaseous fluid into or across an entrance to a receptor member provided in a spaced apart relationship with the nozzle member, the receptor member defining an open cavity, thereby to excite resonance of gaseous fluid in the receptor member to generate the sonic energy.

It is to be understood that dimensions of the nozzle and receptor member (which may also be described as a resonant cavity member) may be selected to provide a specific frequency of oscillation of an air column in the cavity. In some embodiments the apparatus is arranged wherein gas emerges from the nozzle at supersonic speed and forms a standing pressure wave. Alternatively the gas may emerge from the nozzle at subsonic speed and form a standing pressure wave.

A gap between the nozzle and the receptor member may be adjusted such that an open end of the receptor member is positioned at an optimum location with respect to the pressure wave.

It is to be understood that acoustic energy associated with the oscillating air column radiates outwardly into the surrounding gas.

The apparatus may be operable to cause a sonic standing wave such as an ultrasonic standing wave to be established between the nozzle member and the receptor member.

Optionally the apparatus may be operable to direct a supersonic flow of gaseous fluid through the nozzle.

Advantageously the apparatus may be operable to establish a stable shockwave pattern between the nozzle and the receptor member.

The apparatus may be operable to adjust a distance between the receptor member and the nozzle.

Advantageously the apparatus may be operable to adjust a depth of the cavity defined by the receptor member.

This feature has the advantage that the apparatus may be adjusted to enhance an amount of sonic energy of a required frequency that is generated by the apparatus. In some arrangements this feature may allow tuning of a frequency of sonic energy generated by the apparatus.

Optionally the receptor member is coupled substantially directly to the column wherein sonic energy may be launched into liquid medium flowing through the column.

By 'coupled directly' is meant that the receptor member is in substantially direct contact with the column whereby sonic energy is communicated to the liquid via the column itself.

The receptor member may be coupled directly to the column whereby the column vibrates at a frequency corresponding to that of sonic waves generated by the device thereby to introduce the sonic waves into liquid in the column.

It is to be understood that the sonic energy launched into the column may be in the form of ordinary sonic waves and not sonic shock waves. The waves may be of a frequency determined by the device such as an ultrasonic frequency.

Advantageously the receptor member is provided within a chamber, the nozzle being arranged to direct a flow of gaseous fluid into or across the entrance to the receptor member wherein sonic pressure waves are generated within the chamber.

It is to be understood that in some embodiments the chamber itself may be arranged to resonate due to resonance of air in and immediately outside the receptor member. Thus in some embodiments air in and immediately outside the receptor member may be arranged to resonate at an overtone of the chamber or optionally at two or more overtones.

The chamber may alternatively be referred to as a housing.

Further advantageously the nozzle member and receptor member may be provided within the chamber.

Thus the process of injecting gas from the nozzle member into the receptor member resulting in resonance of gas may take place substantially entirely within the environment defined by the chamber. This environment may be a substantially gas-filled environment under normal operating conditions in use. Thus any liquid medium that might enter the chamber when gas is not flowing through the nozzle member may be expelled when gas is introduced into the chamber through the nozzle member.

Advantageously the chamber may be provided in acoustic communication with liquid medium flowing through the column.

Advantageously the chamber may be provided within the column.

In some arrangements a flowstream of liquid medium through the column may be arranged to flow in direct contact with the chamber.

Advantageously the sonic energy generator may be operable to communicate sonic energy into the liquid medium by means of a flexible diaphragm.

The flexible diaphragm (which may also be referred to as a membrane) may provide amplification means for increasing an amplitude of sonic energy launched into the liquid medium.

The flexible diaphragm may be arranged to reduce a mismatch between an impedance of the sonic generator and an impedance of the liquid medium.

Optionally the diaphragm is arranged to resonate at a frequency corresponding to that of the sonic energy generated by the sonic generator.

Advantageously the diaphragm is formed from at least one selected from amongst a metallic material and a polymeric material.

The diaphragm may be arranged to provide amplification means in combination with a substantially horn-shaped chamber or housing. Other arrangements are also useful.

By horn shape is meant that a diameter of the chamber increases in a direction towards the diaphragm which may be arranged to seal a free end of the chamber in a substantially airtight manner. The diameter of the chamber may increase such that in side-view a wall of the chamber flares outwardly in a substantially curved manner.

Advantageously the receptor member may be mounted to the diaphragm thereby to couple sonic energy generated by the generator into liquid medium on an opposite side of the diaphragm.

Advantageously the diaphragm may be arranged to resonate in a mode in which the receptor member remains substantially stationary.

This feature has the advantage that the distance between the receptor member and nozzle member may be kept substantially constant whilst at the same time allowing improved coupling between the receptor member and diaphragm (and thereby the liquid medium) by virtue of the fact that the receptor member is coupled to the diaphragm.

Optionally the receptor member is provided with an aperture in a basal wall thereof whereby sonic energy may be coupled to the diaphragm.

Advantageously the diaphragm may be arranged to define a wall of the chamber.

Advantageously may have at least a portion of the chamber has a cross-sectional area that increases as a function of distance from the nozzle member.

This portion of the chamber may form an 'amplification chamber', a 'horn' or an 'acoustic horn'. The diaphragm may provide a wall of the amplification chamber across a region of increased cross-sectional area relative to another portion of the chamber thereby to enhance an efficiency with which sonic energy may be coupled into the liquid medium.

The amplification chamber may increase in cross-sectional area in a linear manner or according to an alternative, prescribed mathematical relationship. In some embodiments an inner wall of the chamber may be shaped to correspond to a curve, optionally a logarithmic curve.

Advantageously at least a portion of the chamber may have a substantially tapered cross-section.

Optionally at least a portion of the chamber has a substantially conical shape.

Further optionally the at least a portion of the chamber may have a substantially frusto-conical shape.

Advantageously the fluid delivery device may comprise the sonic generator, wherein gaseous fluid employed to generate sonic energy is arranged to be injected into the column thereby to pump fluid through the column.

Thus a process of delivering gaseous fluid (or 'gas') into the column may be arranged to generate sonic energy.

Alternatively gaseous fluid employed to generate sonic energy may be arranged not to be injected into the column.

Thus in some arrangements, the gaseous fluid may to be vented to atmosphere, stored in a storage tank, or re-pressurised for use in continued operation of the sonic energy generator.

In some embodiments where a gas is used that may not be injected into the liquid medium the gas may therefore be directed other than into liquid in the column.

Advantageously sonic energy generated by the sonic energy generator may comprise ultrasonic energy.

Optionally sonic energy generated by the generator consists substantially of ultrasonic energy.

Advantageously the fluid delivery device may be arranged to be provided in a flowstream of the liquid medium through the column.

The device may have an upstream portion and a downstream portion.

Advantageously the downstream portion may be tapered thereby to reduce an amount of drag experienced by the device in the flowstream.

The receptor member may be provided in the upstream portion of the device.

Advantageously the diaphragm may be arranged to direct the sonic energy into the liquid medium in an upstream direction with respect to a flow of liquid medium through the column.

In some alternative embodiments the diaphragm may be arranged to direct sonic energy across the flow of liquid medium through the column.

In some embodiments the diaphragm may be arranged to direct sonic energy in a direction downstream of the flow of liquid medium through the column.

Optionally the apparatus may comprise a plurality of sonic energy generators.

This feature has the advantage that an amount of sonic energy introduced into liquid in the column may be increased.

The plurality of sonic generators may be provided substantially at the first location of the column.

Alternatively the plurality of generators may be provided at a different location, and/or at a plurality of locations of the column.

Advantageously the apparatus may comprise a bubble generator operable to provide gas bubbles in liquid in the column, the apparatus being operable to subject the bubbles to sonic energy generated by the sonic energy generator.

This feature has the advantage that an effect of sonic pressure waves generated by the sonic generator on aquatic organisms and bacteria may be enhanced.

The bubbles may be generated in liquid prior to injection of liquid into the column or in liquid as it flows through the column.

The bubble generator may be a microbubble generator operable to provide microbubbles in the column upstream of the sonic generator. By microbubble is meant a bubble having a size less than around 1 mm. It is to be understood that in some embodiments the bubble size may have a lower bound of around 1 micrometer. In some embodiments the generator may produce bubbles of sub-micrometer dimensions.

The generator may advantageously comprise a constriction portion through which the liquid medium is forced to flow, the constriction portion having a converging section of reducing cross-sectional area, a throat section and a diverging section of increasing cross-sectional area.

The constriction portion may be in the form of a venturi (or choke) portion.

The apparatus may advantageously be operable to inject gaseous fluid into liquid medium in the column at a location upstream of the constriction portion.

The gaseous fluid may be introduced into the column in such a manner that a shearing effect of a liquid flowing through the column reduces a size of the bubbles below a natural size of the bubbles in a case where gas was injected into liquid that was substantially stationary.

Advantageously the apparatus may be operable to inject gaseous fluid into liquid medium in the throat section.

This feature has the advantage that a shearing effect of liquid flowing through the throat section is greater (due to the greater speed of the liquid) thereby reducing a size of the bubbles below that which would form if bubbles were introduced upstream of the constriction portion.

Advantageously the apparatus may be arranged to provide a flow of the liquid medium into the constriction portion in the form of a vortex.

This feature has the advantage of enhancing generation of microbubbles in the liquid medium by enhancing a shearing effect of the liquid on any bubbles in the liquid and on any bubbles introduced into the liquid.

Further advantageously the apparatus may be arranged to generate a flow of liquid medium into the constriction portion in the form of a vortex by injecting a flow of liquid medium into the column of the apparatus in a direction substantially tangential to an inner surface of the column. The liquid may be injected into the column at a location that is substantially at or radially inward of an inner cylindrical surface of the column thereby to generate the flow vortex.

Advantageously the apparatus may be arranged to generate microbubbles having a diameter in the range of at least one selected from amongst from around 1 micrometer to around 1000 micrometers, around 1 micrometer to around 500 micrometers, around 500 micrometers to around 1000 micrometers, and from around 100 micrometers to around 1000 micrometers.

Advantageously the apparatus may be provided with a draw tube coupled to a base of the column, the draw tube extending in a direction away from a longitudinal axis of the column thereby to draw liquid into the column from a region away from the column.

This feature allows the apparatus to draw liquid into the column from a location distal the upright portion of the column, enhancing circulation of liquid in a tank.

Advantageously the draw tube may be oriented substantially normal to the column.

Advantageously the draw tube is arranged to allow the column to draw liquid therein in a direction substantially tangential to the inner surface of the column thereby to generate vortex flow in the column.

Optionally the column and draw tube define a substantially 'J' or 'L'-shaped arrangement.

Advantageously the fluid delivery device is operable to introduce a gas into the column thereby to reduce a concentration of one or more gases in the liquid.

Further advantageously the fluid delivery device is operable to introduce a gas into the column thereby to reduce a concentration of oxygen in the liquid.

The apparatus may be operable to reduce a concentration of oxygen in the liquid thereby to induce hypoxia in aquatic nuisance species.

The apparatus may be operable to introduce a gas into the column thereby to increase a concentration of one or more gases in the liquid.

The apparatus may be operable to introduce a gas into the column thereby to change an acidity of liquid, for example by increasing a concentration of one or more gases in the liquid.

It is to be understood that apparatus that is operable to increase a concentration of one or more gases in a liquid may cause a decrease in a concentration of at least one other gas in the liquid in order that equilibrium conditions are maintained. For example, if a gas rich in carbon dioxide and low in oxygen (for example having less than one selected from amongst 5%, 4%, 3%, 2%, 1%, 0.5% 0.3% oxygen) is bubbled through seawater that has equilibrated with an ambient environmental atmosphere (such as a seawater or lake environment external to a vessel) an amount of dissolved carbon dioxide in the seawater increases whilst the amount of dissolved oxygen decreases.

Advantageously the fluid delivery device may be operable to introduce carbon dioxide into the column thereby to increase a concentration of carbon dioxide in the liquid.

The apparatus may be operable to increase a concentration of carbon dioxide in the liquid thereby to induce hypercapnia in aquatic nuisance species.

Advantageously the gas comprises carbon dioxide.

The gas may consist essentially of carbon dioxide.

It is to be understood that if the apparatus is arranged to recirculate water in a ballast tank of a vessel, water initially drawn into the ballast tank from the marine environment will likely have a gas concentration corresponding to an equilibrium concentration expected for that water when in equilibrium with atmospheric air. If gas is then introduced into the column of the apparatus to recirculate the water, and the gas has a higher concentration of carbon dioxide than is normally found in air and a lower concentration of oxygen (such as gas generated by an inert gas generator as discussed below), it is to be expected that a concentration of dissolved carbon dioxide will increase and a concentration of dissolved oxygen will decrease.

Advantageously the gas may comprise a gaseous mixture comprising carbon dioxide and nitrogen.

Such a gas mixture is readily available at relatively low cost from an inert gas generator (IGG), including shipboard IGGs as noted above.

The gaseous mixture may consist substantially of carbon dioxide and nitrogen. That is, any quantity of one or more other gases may be substantially negligible.

Optionally the gas comprises a gaseous mixture of carbon dioxide, nitrogen and oxygen.

The gaseous mixture may consist substantially of carbon dioxide, nitrogen and oxygen. That is, any quantity of one or more other gases may be substantially negligible.

The gaseous mixtures may be provided by an inert gas generator, a diesel engine exhaust and/or in the form of a ship's flue gas.

It is to be understood that a standard shipboard inert gas generator such as a generator of the 'Holec' type typically produces a gas having a composition of approximately 2-3% Oxygen, around 12-14% carbon dioxide and a balance of nitrogen. Such oxygen levels may in some cases be too high to kill aquatic nuisance species or to prevent regrowth thereof.

Shipboard flue gas systems, which are used only for blanketing of cargoes that can tolerate contamination by soot such as crude oil, typically contain around 4.5% oxygen. Legislation requires that the oxygen content be less than 5%. It is to be understood that such oxygen levels may be too high to kill aquatic nuisance species and/or prevent regrowth thereof.

In some embodiments the gas may contain only trace oxygen, in the range from around 0.1% to around 0.3%, optionally around 0.2% oxygen, around 12-14% carbon dioxide, the balance (remainder) being nitrogen. In some embodiments a concentration of oxygen may be less than 0.1%. In some embodiments the gas may comprise around 0.2% oxygen, around 12-14% carbon dioxide, the balance (remainder) being nitrogen. In some arrangements carbon monoxide may additionally be present, optionally only a trace amount and further optionally up to around 800 ppm carbon monoxide. The gas may comprise substantially no soot. In some arrangements a small amount of soot may be present.

In a further aspect of the invention for which protection is sought there is provided a liquid storage tank comprising apparatus according to the preceding aspect.

The tank may be in the form of a substantially L-shaped tank.

Advantageously the column may be provided in a leg portion of the tank and the apparatus may have a draw tube that extends into a (lower) foot portion of the tank laterally away from the leg portion.

In a still further aspect of the invention for which protection is sought there is provided a marine vessel comprising a ballast tank provided by a tank according to the preceding aspect.

In an aspect of the invention for which protection is sought there is provided a method of circulating a liquid medium comprising:

pumping the liquid medium through a column of a gas lift pump by means of gas lift whereby a flow of gaseous fluid is introduced into a lift portion of the column being a portion having a substantially continuous, unperforated wall, the method comprising the step of allowing the gas to rise in the column through the lift portion a first distance before entering a perforated portion of the column.

The method may advantageously comprise subjecting liquid rising in the column to sonic energy.

Advantageously the method may comprise generating the sonic energy by means of a whistle device, the method comprising providing gaseous fluid to the whistle device thereby to generate the sonic energy.

Further advantageously the method may comprise exhausting into the column gas that has been introduced to the whistle device thereby to cause pumping of liquid medium through the column.

BRIEF DESCRIPTION OF THE DRAWINGS

Embodiments of the invention will now be described with reference to the accompanying figures in which:

FIG. 18 shows (a) a side view and (b) a plan view of an array of 16 fluid delivery devices according to the embodiment of FIG. 17 provided in a column of the gas lift pump apparatus of FIG. 1(a);

FIG. 21 shows a cyclone microbubble generator according to an embodiment of the invention in (a) cross-section and (b) end view as viewed in the direction of arrow B of (a).

DETAILED DESCRIPTION

Figure 1A:
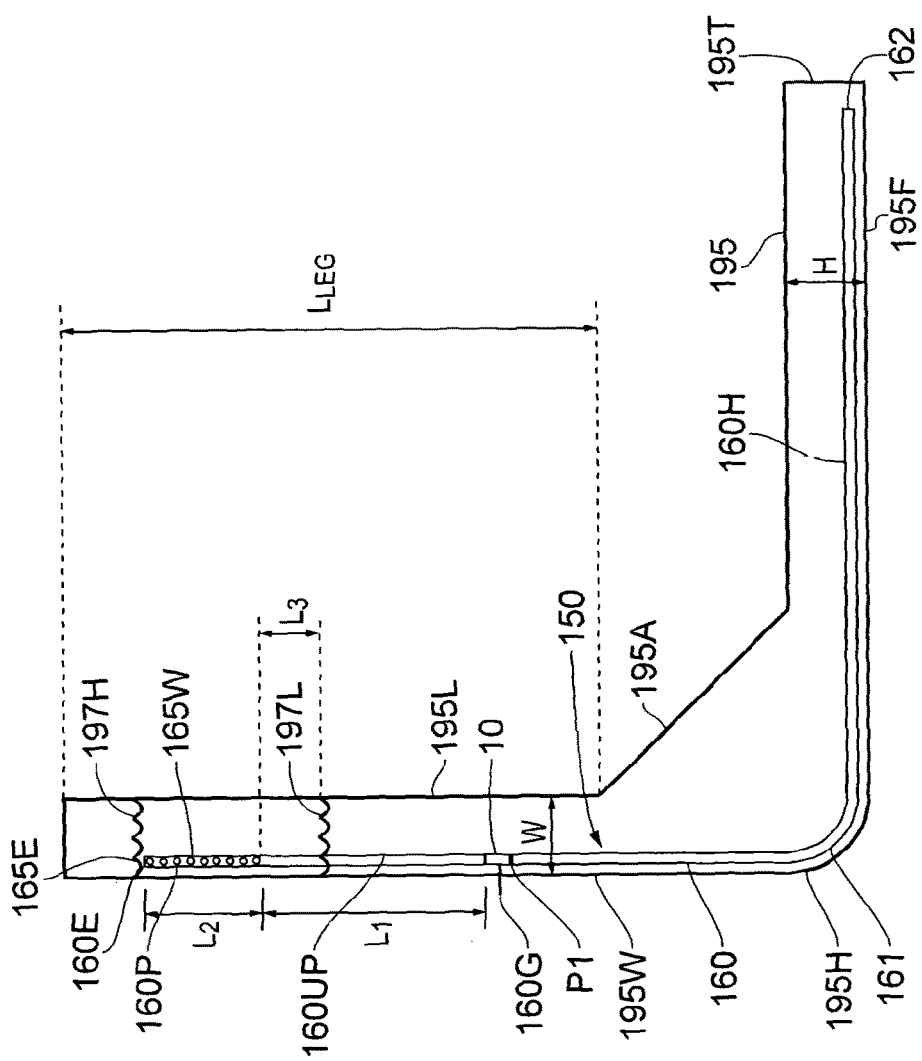
FIG. 1 shows schematic cross-sectional views of (a) an L-shaped ballast tank of a vessel having gas lift pump apparatus according to an embodiment of the invention installed therein; (b) the ballast tank of (a) with gas lift pump apparatus according to a further embodiment of the invention installed therein; and (c) a rectangular ballast tank of a vessel having the gas lift pump apparatus shown in (b) installed therein.

FIG. 1(a) shows gas lift pump apparatus 150 according to an embodiment of the invention installed in a substantially L-shaped ballast tank 195 of a vessel. The apparatus 150 may also be referred to as ballast water treatment apparatus. The shape of the ballast tank 195 shown is one commonly used in vessels, in particular ocean going cargo vessels. The tank 195 may be considered to have a substantially upright leg portion 195L and a foot portion 195F projecting laterally away from the upright leg portion 195L.

The pump apparatus 150 may also be described as liquid circulation apparatus since in the arrangement shown it is employed to recirculate liquid in the ballast tank 195.

The apparatus 150 has an immersion member 160 in the form of a substantially hollow tube member or column 160 provided in a substantially upright orientation within the ballast tank 195.

In the embodiment shown, at a lower end of the column 160 a bend portion 161 is provided that couples the lower end of the column 160 to a draw tube or intake tube 160H that projects laterally away from a longitudinal axis of the column 160 along the foot portion 195F of the ballast tank 195. The draw tube 160H has a liquid inlet 162 at a free end thereof in a toe region 195T of the tank 195 distal the leg portion 195L. The column 160 has a liquid outlet aperture 165E at an upper free end thereof.

As shown in FIG. 1(a) the foot portion 195F of the ballast tank 195 has a similar height H to a width W of the leg portion 195L although other arrangements are also useful.

In the arrangement shown the column 160, bend portion 161 and draw tube 160H are mounted in a spaced apart relationship with an outer wall 195W of the ballast tank 195. In some embodiments the column 160 may be provided in another location. In some embodiments the column 160 may be provided at a different location within the tank 195. In some embodiments at least a portion of the column 160 (and in some embodiments substantially the whole of the column 160) may be provided external to the tank 195.

The feature that the column 160 extends from the toe region 195T of the foot portion 195F to the leg portion 195L, enhances recirculation of liquid in the tank 195 and reduces a risk of 'dead spots' or substantially stagnant regions becoming established in the tank 195. Thus substantially all liquid within the tank 195 is encouraged to flow through the column 160.

In the embodiment of FIG. 1(a) it can be seen that the column 160 extends to an upper region of the leg portion 195L may further enhance circulation of ballast water.

This has the advantage that if the column 160 is employed to treat liquid in the tank 195, for example by exposure to a particular gas or gas mixture, a risk that liquid in one of more zones of the tank 185 fails to be exposed to the gas is reduced. In the absence of the draw tube 160H water in the toe region 195T might otherwise fail to mix with water that has been drawn through the column 160 and therefore have a different composition of dissolved gas to that in the leg portion 195L.

In the case that the apparatus 150 is used for the control of aquatic nuisance species populations, by control of an amount of one or more gases dissolved in the liquid, a risk that aquatic nuisance species fail to be exposed to liquid of a prescribed dissolved gas composition may be reduced by eliminating dead spots.

In some embodiments it is desirable to expose aquatic nuisance species to liquid having reduced levels of oxygen and/or increased levels of carbon dioxide and/or one or more other gases, depending on the gas treatment procedure employed. Reduced levels of oxygen can result in death of aquatic nuisance species by hypoxia. Increased levels of carbon dioxide can result in death of aquatic nuisance species by hypercapnia. If levels of oxygen are reduced and simultaneously levels of dissolved carbon dioxide are increased, death can be induced by a combination of reduced levels of oxygen and increased levels of carbon dioxide, optionally by a combination of hypoxia and hypercapnia.

A gas injector 10 is arranged to inject gas into the column 160 at position P1. In the embodiment shown the position P1 is arranged to be a position below a lowest expected level of liquid in the ballast tank 195 (labelled 197L) at which operation of the gas lift pump apparatus 150 is required in use. Level 197L may be referred to as a lower or lowest working level.

A supply of gaseous fluid (or gas) is provided to the injector 10 when required by means of a gas supply conduit 160G.

In the embodiment shown, an outlet aperture 165E at an upper free end 160E of the column 160 is provided, i.e. the tubular member defining the column 160 is open-ended. The upper free end 160E is provided below an expected upper limit of a fill level 197H of the tank 195 although other arrangements are also useful. Such a fill level 197H may be referred to as an upper working level.

A portion 160P of a wall of the column 160 from the upper free end 160E over a length L2 of the column from the free end 160E is perforated. In the embodiment shown the wall is provided with a plurality of apertures 165W allowing water within the column 160 to pass out from the column 160. The perforated portion 160P in FIG. 1(a) may also be referred to as a perforated guide tube or guide tube portion of the column 160.

The apertures 165W in the perforated guide tube 160P are sufficiently large to allow passage therethrough of particles or other objects such as aquatic nuisance species that might become entrained in flow of liquid through the column 160. This is in order to prevent blockage of the apertures 165W. In some embodiments the apertures have a diameter of around 10 cm although other sizes are also useful. In some embodiments the apertures are around 15 cm in diameter. In some embodiments the apertures are formed to occupy an area of from around 25% to around 50% of a surface area of the guide tube 160P. Other arrangements are also useful.

An unperforated portion 160UP of the column 160 of length L1 is provided between the guide tube portion 160P and the gas injector 10. The unperforated portion 160UP may be referred to as a 'lift portion' or 'lift tube' 160UP. The lift tube 160UP enables gas injected by the injector 10 to establish pumping of liquid through the column 160 before the liquid enters the perforated guide tube 160P as will be described in more detail below. In some embodiments, including that of FIG. 1(a), substantially the whole of the column below the guide tube 160P and the bend portion 161 and draw tube 160H are formed to have a substantially continuous, unperforated wall.

It can be seen that in the embodiment shown, the perforated guide tube 160P is provided at a level that is a distance L3 above the lowest expected level of liquid in the tank, 197L (or lower working liquid level).

The position P1 of gas injector 10 and the length L1 of the lift tube 160UP are selected such that distance L3 (i.e. the length by which the lift tube 160UP protrudes above the lower working liquid level) does not exceed 30% of the length L1 of the lift tube 160UP from the gas injector 10 to the guide tube 160P although other values are also useful. This is so as to ensure sufficient pumping action may be achieved by injection of gas through gas injector 10 to lift liquid in the ballast tank from the lower working liquid level 197L to the bottom of the perforated guide tube 160P. This allows liquid rising through the lift tube 160UP to be discharged through the apertures 165W in the guide tube 160P facilitating liquid circulation.

Figure 1B:
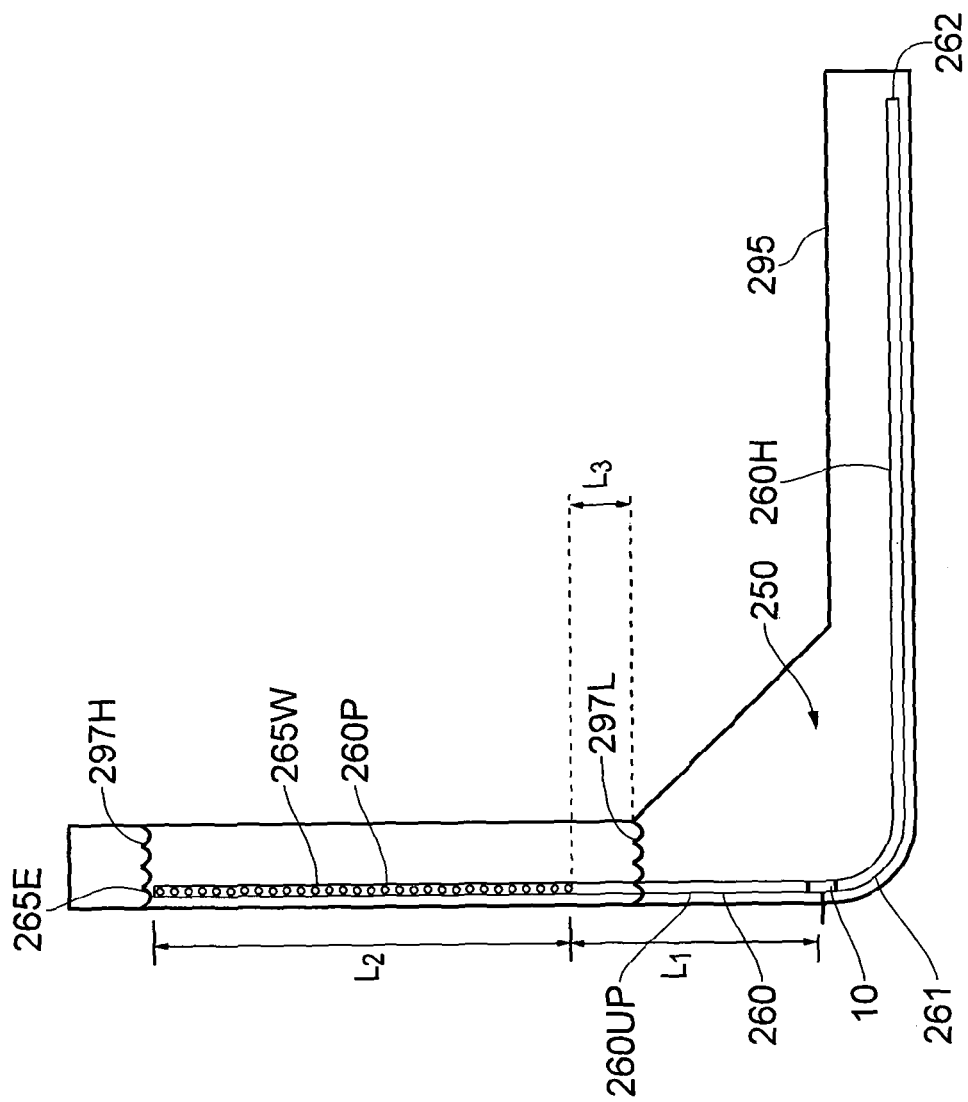

FIG. 1(b) shows gas lift pump apparatus 250 according to a further embodiment of the invention installed in a ballast tank 295 of a vessel. Like features of the embodiment of FIG. 1(b) to that of FIG. 1(a) are shown with like reference signs prefixed numeral 2 instead of numeral 1.

The ballast tank 295 of the embodiment of FIG. 1(b) is substantially identical to the tank 195 of the embodiment of FIG. 1(a). The apparatus 250 is similar to the apparatus 150 of FIG. 1(a) except that gas injector 10 is installed at a lower end of column 260 and not a location at or near a midpoint of the column with respect to a vertical height of the column. A lift tube portion 260UP of the column 260 is of a similar length (L1) to the lift tube portion 160UP of the embodiment of FIG. 1(a). Because the injector 10 is located at the base of the column 260 (immediately above a bend portion 261) a perforated guide tube portion 260P of the column 260 is longer than that of the embodiment of FIG. 1(a). However it can be seen that an overall length of the column 260, bend portion 261 and draw tube 260H is substantially the same as the embodiment of FIG. 1(a).

It can be seen from FIG. 1(b) that because the injector 10 is located at a lower position of the column 260 and the (perforated) guide tube portion 260UP extends further down the column 260, the gas lift pump apparatus 250 is able to maintain circulation of liquid in the tank 295 over a wider range of depths of liquid in the tank 295. This range may be referred to as a 'working range' of the apparatus.

Figure 1C:
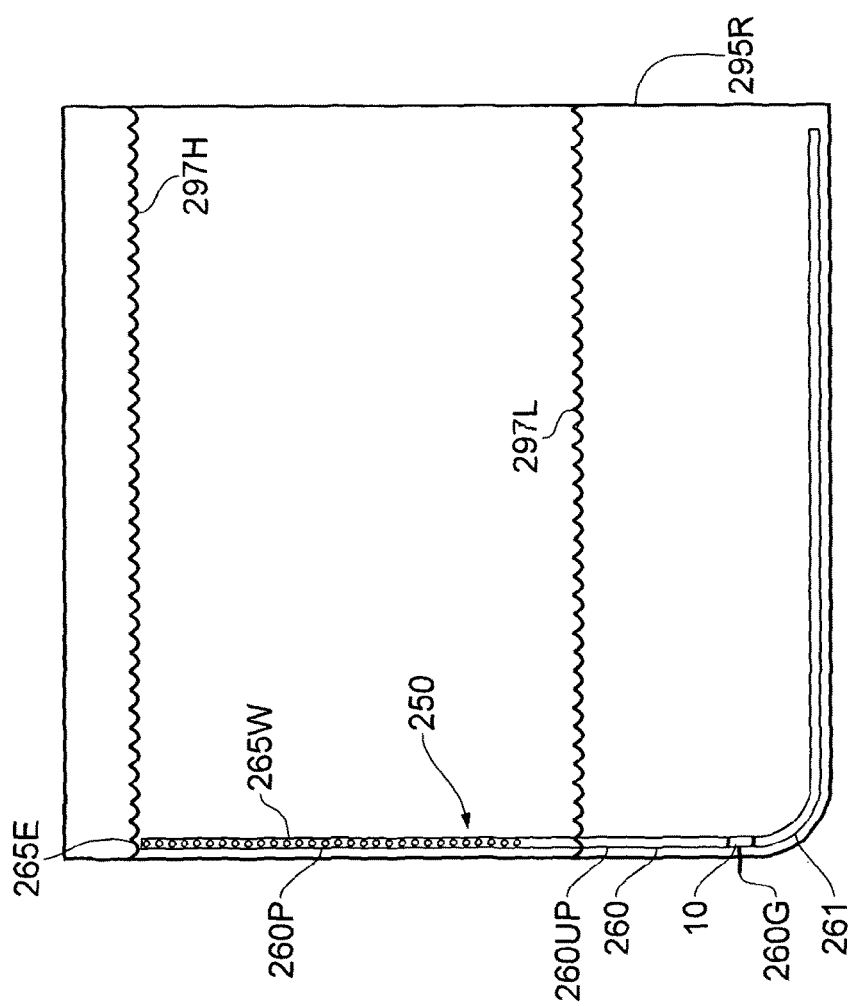

FIG. 1(c) shows the gas lift pump apparatus 250 of the embodiment of FIG. 1(b) installed in a rectangular ballast tank 295R of a vessel. It is to be understood that operation of the apparatus 250 is similar to that of the embodiment of FIG. 1(b).

Figure 2:
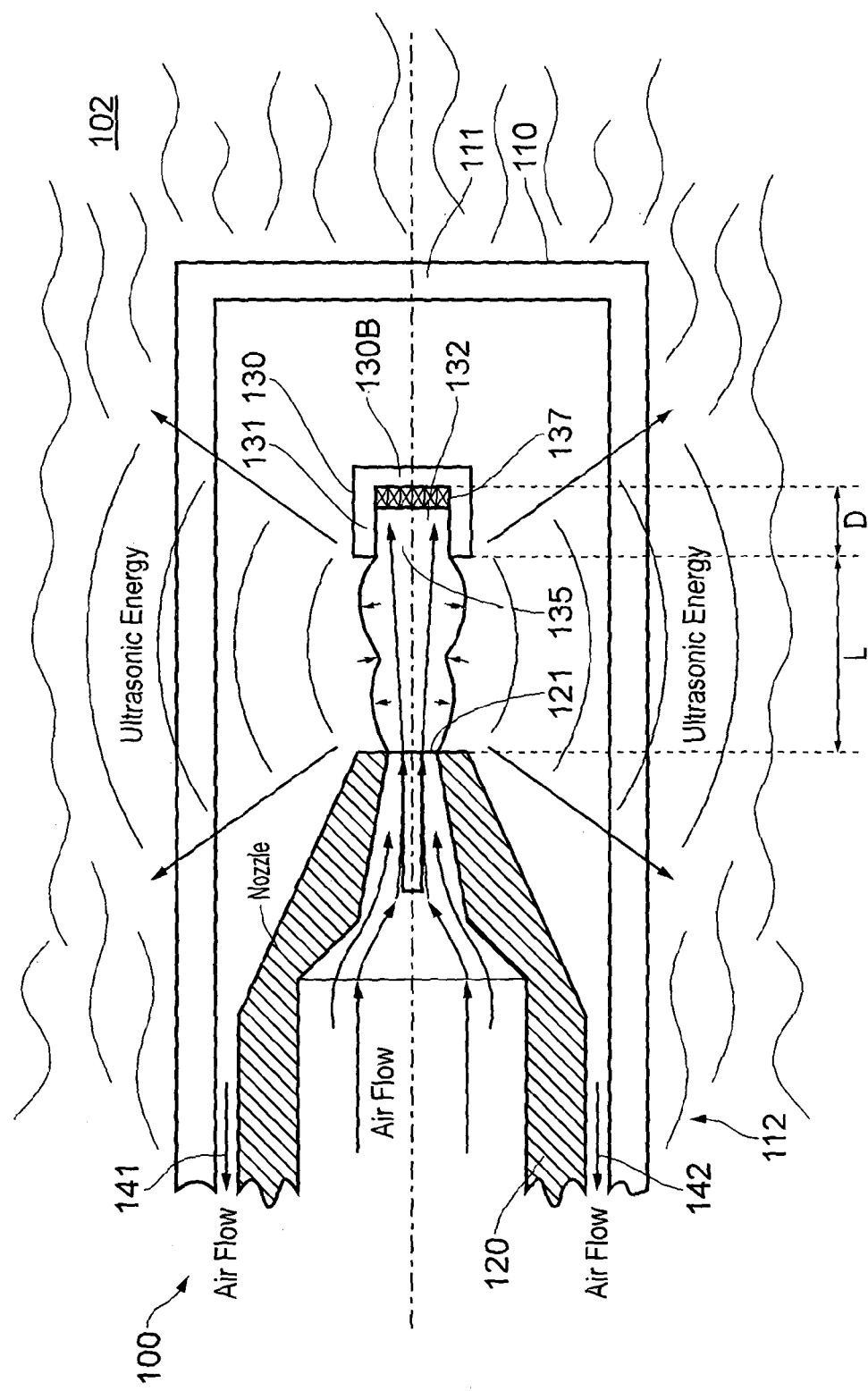
FIG. 2 is a cross-sectional schematic illustration of a fluid delivery device according to an embodiment of the invention arranged to generate sonic energy by a flow of gas therethrough.

FIG. 2 shows a fluid delivery device 100 according to an embodiment of the invention operable to generate sonic energy in the form of sonic waves by means of a flow of gas through the device 100 in the manner of a whistle. The device 100 is also operable to inject gas that has passed through the device 100 into liquid in the column of gas lift pump apparatus.

In some embodiments the device 100 may replace the injector 10 of the embodiments of FIG. 1(a) to (c). In some embodiments the device 100 is arranged to generate sonic energy that is transmitted or launched into liquid flowing through the column of gas lift apparatus but to vent gas flowing therethrough to an alternative location (such as to a gas storage tank, a gas recirculation line or to atmosphere). The device 100 may be arranged to direct the sonic energy into liquid flowing through the column of the gas lift pump apparatus.

The device 100 has a chamber 110 forming a body portion of the device 100 and a fluid nozzle 120 arranged to supply a flow of gaseous fluid into the chamber 110 through an outlet aperture 121 of the nozzle 120. In some embodiments the device 100 is operated to provide a flow of gas (such as air, nitrogen or other gas such as any suitable inert gas or gas mixture) out from the nozzle 120 at a supersonic velocity such as a speed of around 340 ms$^{-1}$ or greater. Other velocities are also useful including subsonic velocities.

In the embodiment shown the nozzle 120 is arranged to provide the flow of gaseous fluid into the chamber 110 in a direction towards a first end 111 of the chamber 110 being a closed end. The nozzle 120 has a substantially frusto-conical external and internal profile. An angle of taper of an inner frusto-conical surface of the nozzle 120 with respect to a cylinder axis thereof is less than that of the external frusto-conical surface although other arrangements are also useful.

At a second end 112 opposite the first end 111 the chamber 110 has openings 141, 142 arranged to allow gaseous fluid to flow out from the chamber 110.

In the embodiment of FIG. 2 a receptor member 130 is provided in the chamber 110. The receptor member 130 is in the form of a cupped member having walls 131 defining an open cavity 137, an opening 135 of the receptor member 130 facing in a direction towards the nozzle 120.

The device 100 is arranged wherein gaseous fluid entering the chamber 110 is directed to flow towards the opening 135 of the receptor member 130.

The flow of gaseous fluid through the nozzle 120 is arranged to occur at a substantially constant rate and pressure. As the gaseous fluid exits the nozzle 120 the fluid expands generating a forward pressure wave (being a shockwave) travelling in a forward direction towards the receptor member 130.

A portion of the forward pressure wave impinges on the receptor member 130. A pressure of fluid in the receptor member 130 thereby increases and a reverse pressure wave (being a shockwave) is generated, travelling in a reverse direction to the forward pressure wave. The reverse pressure wave may also be referred to as a 'reflected' pressure wave or shockwave.

The reverse pressure wave meets the forward pressure wave thus providing a 'feedback' mechanism to the propagation of the forward wave. Interaction of the forward and reverse waves as gaseous fluid exits the receptor member 130 may be arranged to result in the generation of sonic energy. In some arrangements ultrasonic energy may be produced. The sonic energy (which may be or include ultrasonic energy) propagates out from the chamber 110 into liquid 102 that is in contact with the chamber 110. The sonic energy propagates into the liquid 102 in the form of longitudinal pressure waves that propagate through the liquid 102 away from the chamber 110.

In the embodiment of FIG. 2 gas trapped in the receptor member 130 resonates at a resonant frequency as gas is directed towards the receptor member 130 by the nozzle 120. It is to be understood that in some arrangements the chamber 110 may therefore be referred to as a resonance chamber 110 since resonance of gaseous fluid may take place therein. It is to be understood that the chamber 110 may not itself resonate, i.e. the chamber 110 may not vibrate at a resonant frequency of the chamber 110. However gas trapped within the receptor member 130 may resonate at a frequency determined inter alia by a depth D of the cavity 137 defined by the receptor member 130.

Gaseous fluid entering the chamber 110 is arranged to exit the chamber 110 through a plurality of outlet conduits 141, 142. In the embodiment of FIG. 2, fluid exiting the chamber 110 flows over an outer surface of the nozzle 120 in a direction that is substantially the reverse of the direction in which fluid enters the chamber 110 through the nozzle 120.

In the embodiment shown the device 100 is arranged to be immersed in a liquid medium thereby to launch the sonic energy into the liquid medium.

As noted above, the frequency of sonic energy generated by the device 100 may depend on a depth D of the cavity 137 defined by the receptor member 130. In some embodiments the depth D may be increased or decreased thereby to tune operation of the apparatus. Adjustment of the depth D or distance of the receptor member 130 from the nozzle 120 may be required depending on an expected operating condition of the apparatus, such as temperature, pressure and/or one or more other operating conditions or parameters. Adjustment may also be required to accommodate tolerances in manufacture and/or assembly.

In the embodiment shown the position of the receptor member 130 is fixed. In some embodiments the distance between the receptor member 130 and the outlet aperture 121 of the nozzle 120 may be changed, for example by means of a screw mechanism. Adjustment of the position of the receptor member 130 is useful for example in compensating for machining tolerances associated with manufacture and tolerances associated with assembly of the device 100. Other arrangements are also useful such as other means for adjusting a depth D of the receptor member 130.

It is to be understood that the selection of a resonant frequency of the device 100, i.e. a frequency of sonic energy generated by the device 100, may be important in applications where killing of aquatic nuisance species is desirable, such as bacterial species. This is because some bacteria may be more susceptible to death when exposed to sonic waves such as ultrasonic waves of a prescribed frequency or range of frequencies compared with sonic waves of one or more other frequencies.

In some embodiments a plurality of devices 100 may be provided each arranged to generate sonic energy of substantially different frequencies or ranges of frequencies in order to enhance an efficiency of a liquid treatment apparatus in killing ANS.

Figure 3:
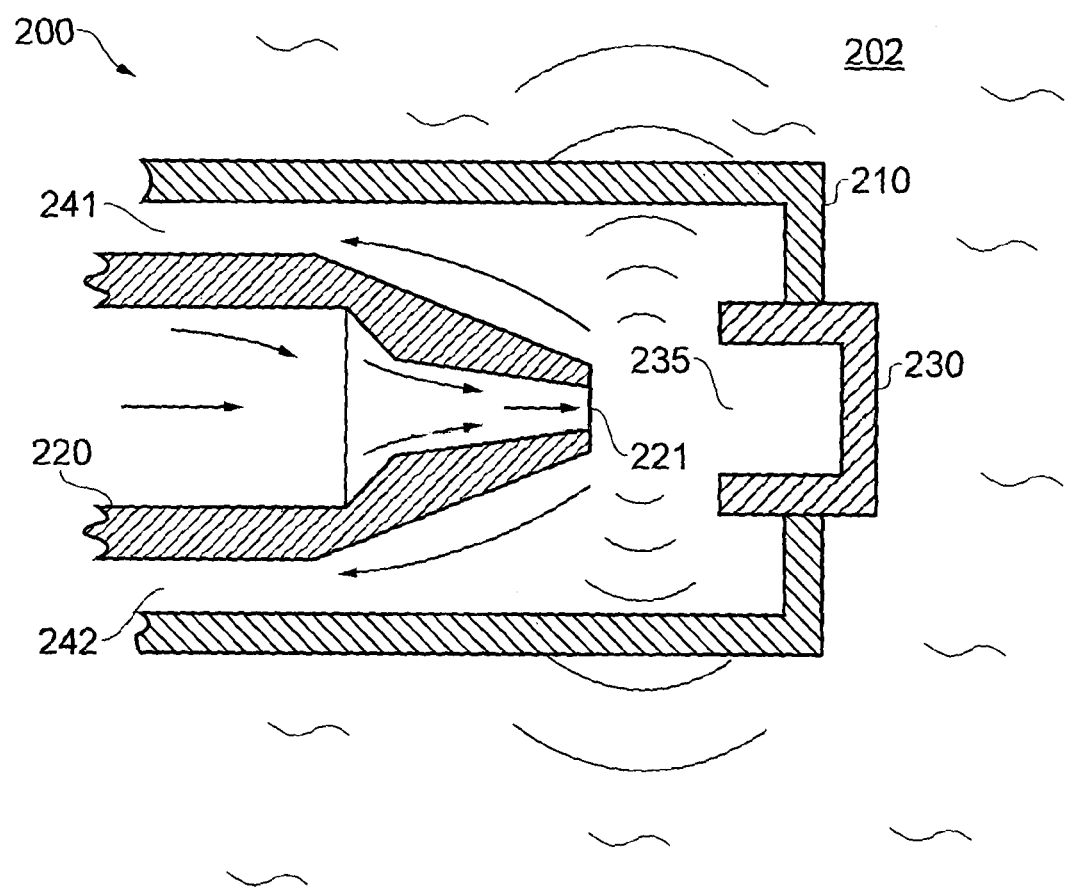
FIG. 3 is a cross-sectional schematic illustration of a fluid delivery device according to a further embodiment of the invention arranged to generate sonic energy by a flow of gas therethrough.

FIG. 3 shows a fluid delivery device 200 according to a further embodiment of the invention. Like features of the device 200 of FIG. 3 to those of the device 100 of FIG. 2 are provided with similar reference numerals prefixed numeral 2 instead of numeral 1.

The device 200 has a chamber 210 into which a nozzle 220 is arranged to provide a flow of gaseous fluid. A receptor member 230 is provided in a wall of the chamber 210 and positioned in a direct line of sight of gaseous fluid entering the chamber 210 through the nozzle 220.

As in the embodiment of FIG. 2 the receptor member 230 is in the form of a cupped member. An external portion of the cupped member is arranged to be in direct contact with an environment external to the device 200.

In use, impingement on the receptor member 230 of gaseous fluid flowing into the resonance chamber 210 causes the generation of sonic energy as described with respect to the embodiment of FIG. 2 and the launching of sonic energy in the form of longitudinal sonic pressure waves into a liquid medium 202 in acoustic communication with the chamber 210. The device 200 is thereby operable to kill certain ANS such as certain bacterial ANS. The device 200 may be arranged to launch ultrasonic energy (ultrasonic pressure waves) into the liquid medium 202.

Furthermore, impingement of gaseous fluid on the receptor member 230 is arranged to cause heating of the receptor member 230. Under certain conditions the temperature of the receptor member 230 may rise from an ambient temperature to a temperature injurious to ANS. It is to be understood that, advantageously, liquid in which the device 200 is immersed may flow in contact with an external surface of the receptor member 230 resulting in heating of the liquid. This may further contribute to death of bacteria or other ANS present in the liquid.

In some applications a fluid delivery device 100, 200 according to an embodiment of the invention is provided in gas lift pump apparatus arranged to cause recirculation of liquid in a ballast tank of a marine vessel. Thus one or more of the devices 100, 200 may be provided in addition to or instead of the injector 10 of the embodiments of FIG. 1. One or more of the devices 100, 200 may be provided at the same location as the injector 10 (for example when provided in place of the injector 10) or at one or more different locations of the column 160, 260.

Figure 4:
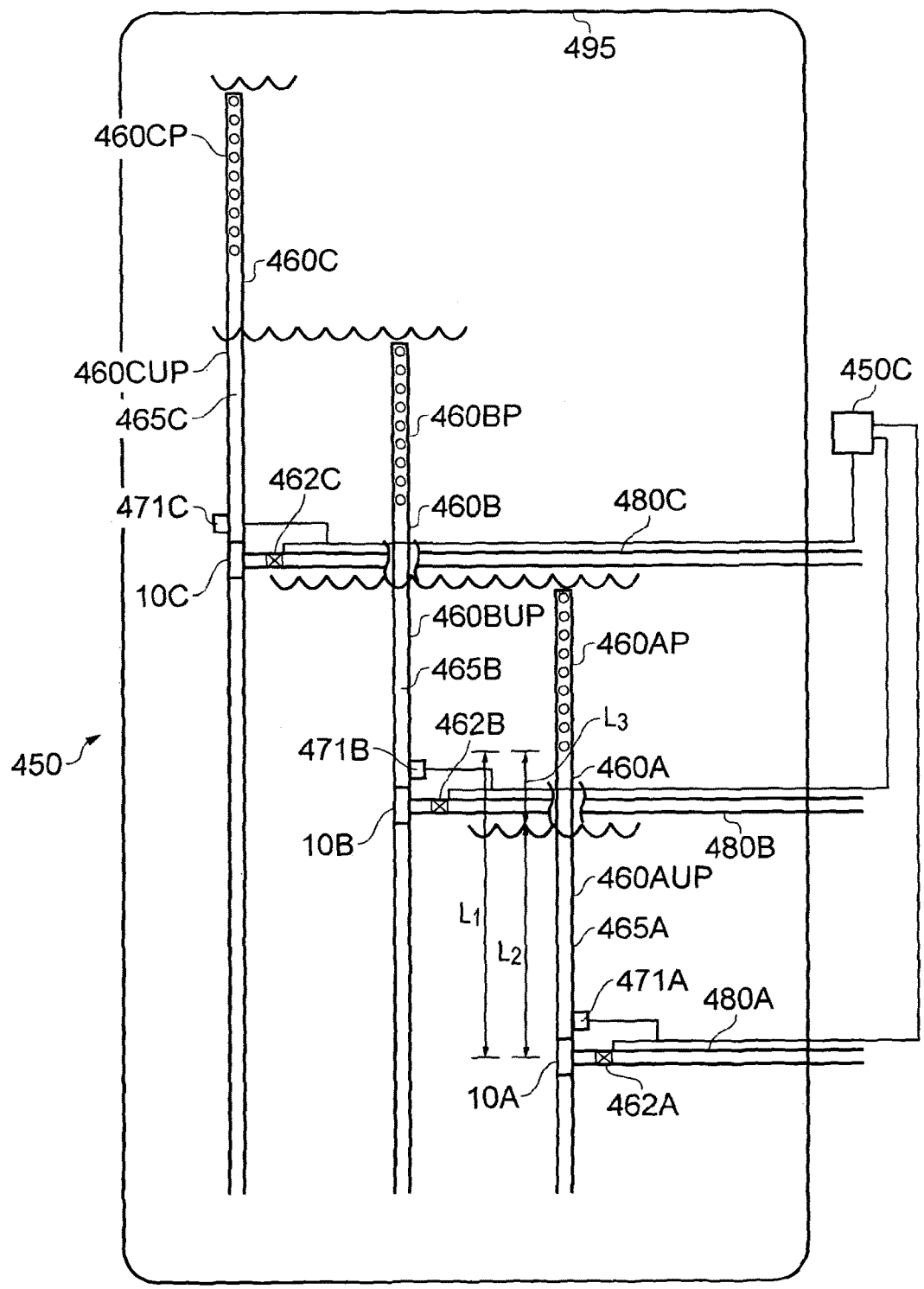
FIG. 4 is a schematic illustration of a gas lift pump apparatus according to a further embodiment of the invention installed in a ballast tank of a vessel.

FIG. 4 shows ballast water treatment apparatus 450 according to a further embodiment of the invention in which more than one column 460 is provided, each column 460 being in the form of a tube member 460. In the embodiment of FIG. 4 three tube members 460A, 460B, 460C are provided. It is to be understood that any suitable number of tube members may be provided.

In the embodiment shown each tube member 460A, 460B, 460C has a single gas injector 10A, 10B, 10C respectively coupled thereto through which gas may be forced into an inner volume 465A, 465B, 465C of the respective tube member 460A, 460B, 460C. Gas is supplied to each injector 10A, 10B, 10C by a respective gas supply conduit 480A, 480B, 480C.

A valve 462A, 462B, 462C such as a check valve is provided in each respective conduit 480A, 480B, 480C upstream of each injector 10A, 10B, 10C in order to allow a flow of gas through each injector 10A, 10B, 10C to be controlled by means of a controller 450C. The valves 462A, 462B, 462C may be positioned in the respective conduits at a location outside of the ballast tank 495 or inside the tank 495 and may optionally be pneumatically actuated, for example by means of an air supply. In some embodiments the valves are not provided in the conduits, but rather at a gas source or in a gas supply line feeding gas to respective conduits 480A, 480B, 480C from a gas source.

Each tube member 460A, 460B, 460C has a liquid level sensor 471A, 471B, 471C, respectively, provided above the corresponding injector 10A, 10B, 10C arranged to provide a signal to the controller 450C when a level of liquid in the tank 495 reaches that of the respective sensor 471A, 471B, 471C. Once a level of liquid in the ballast tank 495 reaches or exceeds a level of a given liquid level sensor 471A, 471B, 471C, the controller 450C allows gaseous fluid to pass into the corresponding tube member 460A, 460B, 460C associated with that level sensor 471A, 471B, 471C through the corresponding injector 10A, 10B, 10C.

If gaseous fluid is being supplied to any other tube member 460A, 460B, 460C when a further liquid level sensor 471A, 471B, 471C is actuated, supply of gaseous fluid to the other tube member 460A, 460B, 460C may be terminated although other arrangements are also useful. For example, a liquid level range over which one injector is arranged to perform gas delivery into its corresponding tube member may be arranged to overlap a liquid level range over which another injector is arranged to perform gas delivery into its corresponding tube member.

It is to be understood that the sonic energy generating fluid delivery devices of FIG. 2 or FIG. 3 may be used in the apparatus 450 of FIG. 4. Other fluid delivery devices according to embodiments of the invention are also useful such as that of FIG. 6 as described below.

In a similar manner to the column 160 of the embodiment of FIG. 1(a) each of the tube members 460A, 460B, 460C has a respective unperforated lift portion (or lift tube portion) 460AUP, 460BUP, 460CUP into which a respective injector 10A, 10B, 10C injects gas. Directly above each unperforated lift portion is a perforated guide tube portion 460AP, 460BP, 460CP.

In some embodiments, instead of each tube member being provided with a level sensor, a separate level sensor may be provided, for example a sensor mounted to a sidewall of the tank. Controller 450C may be arranged to receive a liquid level signal from an external source such as a separate ballast water system controller for controlling loading and unloading of ballast water.

Figure 5:
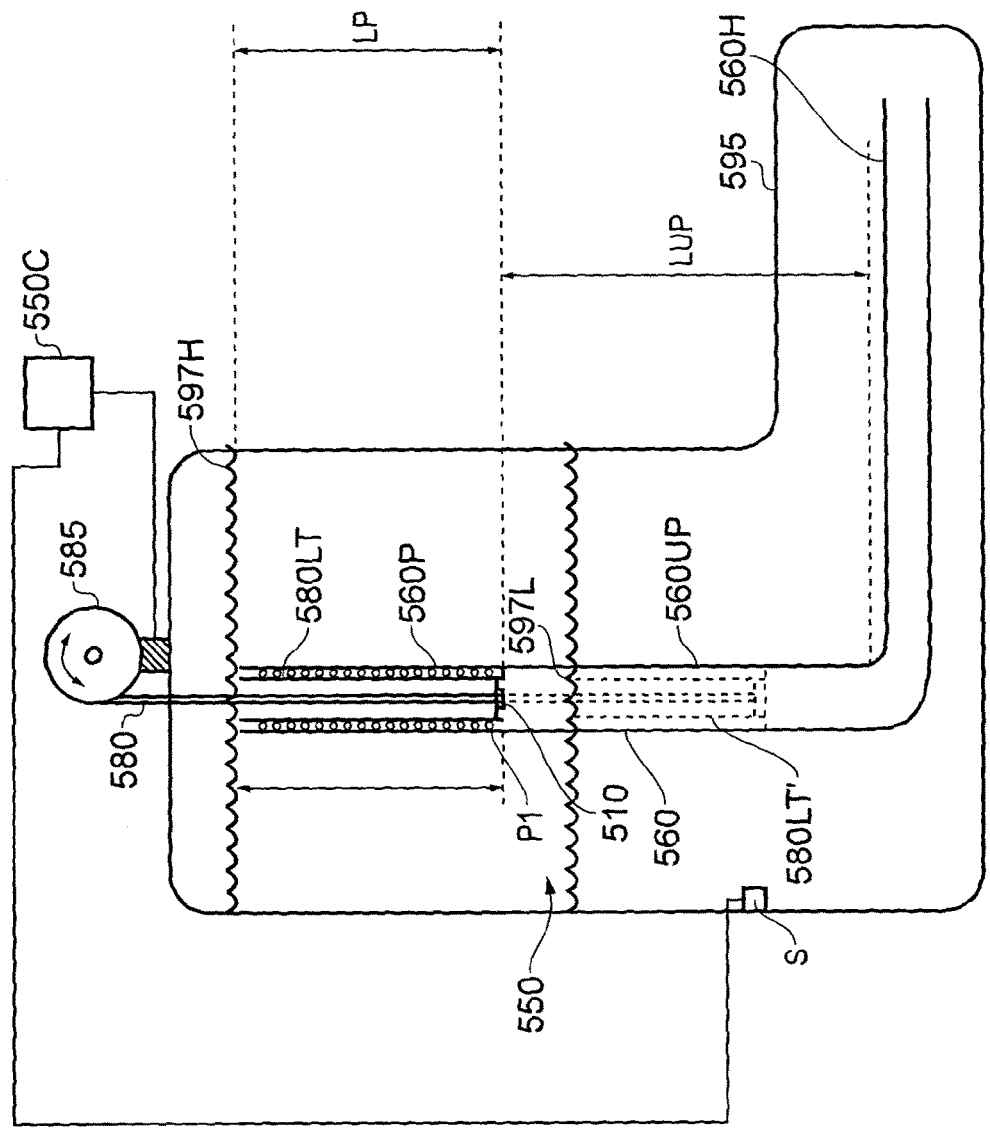
FIG. 5 is a schematic illustration of a gas lift pump apparatus according to a still further embodiment of the invention installed in a ballast tank of a vessel.

FIG. 5 shows apparatus 550 according to an embodiment of the invention in which an upright column 560 in the form of a tube member 560 is provided within a ballast tank 595 of a vessel. A fluid delivery device in the form of a gas injector 510 is provided for injecting gas into liquid in the column 560. In the embodiment shown the gas injector 510 is provided at a free end of a hose 580 arranged to be wound on a drum 585. The gas injector 510 may be raised or lowered within the column 560 by rotation of the drum 585 under the control of a controller 550C.

The column 560 has an unperforated portion 560UP of length LUP from a lower end thereof and a perforated portion 560P of length LP along a remainder of the length to an upper end thereof. The unperforated portion may be referred to as a column lift tube portion 560UP whilst the perforated portion may be referred to as a guide tube portion 560P as described above with respect to the embodiments of FIG. 1 and FIG. 4.

A lift tube member 580LT in the form of an unperforated tube is coupled to the hose 580 and positioned substantially coaxial therewith. The lift tube member 580LT is arranged to be raised and lowered with the gas injector 510. The gas injector 510 is operable to inject gas carried by the hose 580 into liquid in the column 560 at a lower end of the lift tube member 580LT. The lift tube member 580LT has a sufficiently large diameter to allow gas injected into the column 560 by the gas injector 510 to rise within the lift tube member 580LT and induce pumping of gas in the column 560 by gas lift.

FIG. 5 shows the lift tube member 580LT substantially at a highest allowable position within the column 560 when the level of liquid in the tank 595 corresponds to that of the highest (upper) working level 597H.

It is to be understood that the apparatus 550 is operable to position the gas injector 510 a suitable distance below a level of liquid in the tank 595 to allow effective circulation of liquid in the tank 595.

In some embodiments a fluid level monitoring device S is provided that is arranged to determine the level of liquid in the tank 595. The apparatus 550 is operable to determine a required vertical position of the gas injector 510 responsive to the level of liquid in the tank 595 as determined by reference to the monitoring device S.

The apparatus 550 has a 'working range' of liquid in the tank 595 being a range of liquid levels over which pumping of liquid by the apparatus 550 may be conducted. The range is defined by a lower working level 597L and the upper working level 597H. With the level of liquid in the tank 595 substantially at the upper working level 597H and the lift tube member 580LT at the position shown in FIG. 5, injection of gas through injector 510 causes liquid to rise within the lift tube member 580LT and to emerge from the lift tube member 580LT at the upper end thereof, substantially at the free surface of liquid in the ballast tank 595. It is to be understood that in the absence of the lift tube member 580LT, gas injected into the (perforated portion of the) column would fail to cause effective pumping of liquid through the column 160. The presence of the lift tube member 580LT promotes pumping of liquid through the column 160 and therefore effective circulation of liquid in the tank 595.

It is to be further understood that if the lift tube member 580LT is lowered within the column 560, liquid and gas emerging from an upper end thereof as gas flows through the hose 580 rises within the guide tube portion 560P of the column 560 towards the surface in a similar manner to the embodiments of FIG. 1. As the lift tube member 580LT is lowered, with the liquid level at the highest working level 597H, the effective length of the guide tube portion 560P increases. Thus for a given level of liquid in the tank 595 the embodiment of FIG. 5 allows the effective length of the guide tube portion 560P to vary depending on the vertical location of the lift tube member 580LT.

It is to be understood that if the level of liquid in the tank 595 falls below the upper working level 595H the lift tube member 580LT may be lowered. In some arrangements the lift tube member 580LT may be lowered such that an upper end thereof is at or below the liquid level thereby to allow expulsion of pumped liquid from the upper end of the lift tube member 580LT.

In some embodiments, instead of having a fluid level monitoring device S, the apparatus 550 may be arranged to determine a level at which gaseous fluid is to be supplied to the gas injector 510 by positioning the injector 510 at a vertical location within the column 560 at which a flow rate of gas through the hose 580 is within a prescribed range. In some embodiments the apparatus 550 may be arranged to position the injector 510 at a vertical location at which a head of pressure at the injector 510 is within a prescribed range.

Other arrangements are also useful.

In some embodiments the injector 510 has a plurality of gas outlet apertures or outlet nozzles through which gas may flow out from the injector 510. In some embodiments the nozzles may be arranged to direct gas out from the injector 510 in a radial direction at circumferentially spaced positions.

Figure 6:
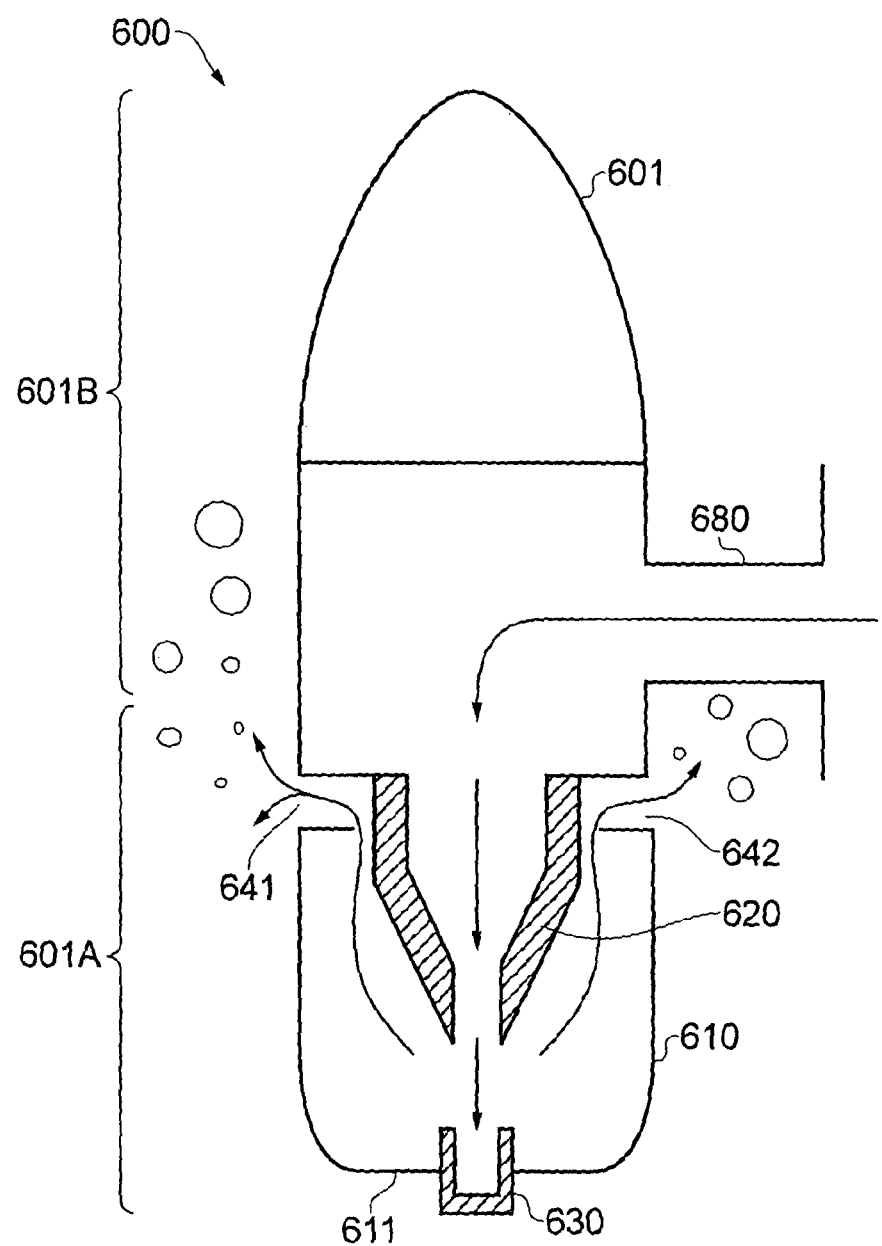
FIG. 6 is a cross-sectional schematic illustration of a fluid delivery device according to a further embodiment of the invention arranged to generate sonic energy by a flow of gas therethrough.

FIG. 6 shows a fluid delivery device 600 according to a further embodiment of the invention. Like features of the device 600 of FIG. 6 to that of the embodiment of FIG. 3 are shown with like reference signs prefixed numeral 6 instead of numeral 2. The device 600 is operable in a similar manner to the embodiments of FIG. 2 and FIG. 3 to generate sonic energy when gas is forced through the device 600 as described below. The device 600 is provided in a housing 601 arranged to be provided in a flowpath of fluid in a column of a gas lift pump apparatus.

Accordingly the device 600 has an upstream portion 601A and a downstream portion 601B as defined with respect to a direction in which fluid flow through the column is expected to occur during a pumping operation (normally an upward direction).

The downstream portion 601B of the housing 601 is tapered to reduce an amount of drag on a liquid flowing past the device 600 as it is pumped by the ejection of gas through the outlets 641, 642.

The upstream portion 601A of the device 600 has a nozzle 620, a chamber 610 and gaseous fluid outlets 641, 642. The device 600 is operable to inject gas under pressure through the nozzle 620 and into a receptor member 630. The receptor member 630 is coupled to an upstream portion of a wall of the chamber 610 and protrudes therethrough. In the embodiment of FIG. 6 the receptor member 630 projects upstream of the chamber 610. This promotes exposure of liquid flowing past the device 600 to the outer surface of the receptor member 630. Flow of gas from the nozzle 620 into the receptor member 630 results in the generation of sonic energy that may be transmitted (or launched) into a liquid medium in which the device 600 may be immersed.

In some embodiments such as that of FIG. 6 the receptor member 630 is arranged to be heated by the flow of gaseous fluid through the device 600 whereby certain ANS may be killed. Thus some of the kinetic energy associated with the flow of gas into the chamber 610 from the nozzle 620 may be dissipated by the receptor member 630 in the form of heat.

Figure 7:
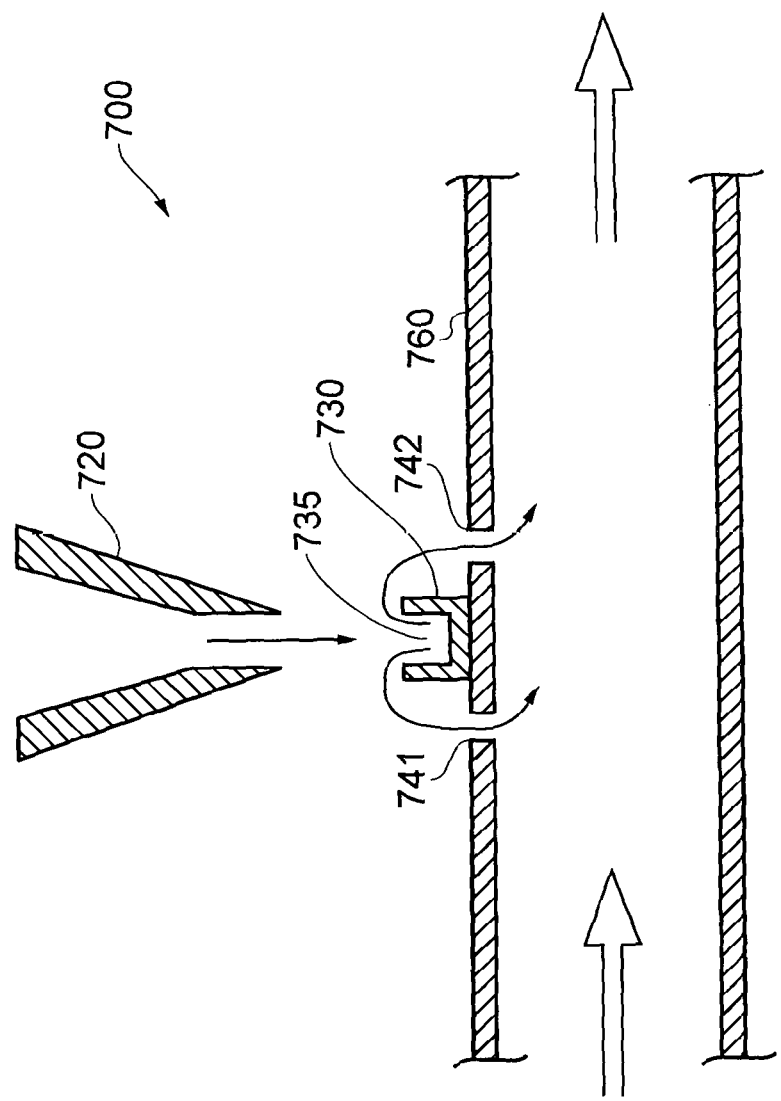
FIG. 7 is a cross-sectional schematic illustration of a fluid delivery device according to a further embodiment of the invention arranged to generate sonic energy by a flow of gas therethrough.

FIG. 7 shows a fluid delivery device 700 according to a further embodiment of the invention. The device 700 has a fluid nozzle 720 and a receptor member 730. The receptor member 730 has a cupped shape as in the case of the embodiments described above and defines a cavity 735. The nozzle member 720 is arranged to direct a flow of gaseous fluid into the cavity 735.

The receptor member 730 is coupled to a fluid conduit or pipe 760 through which liquid may be arranged to flow. In use, gaseous fluid is forced through the nozzle 720 and towards the cavity 735 of the receptor member 730. A forward travelling sonic shockwave is generated when the rate of flow of gaseous fluid through the nozzle 720 is sufficiently high as described above and a backward travelling shockwave is generated as gas from the nozzle 720 is deflected out from the receptor member 730. The device 700 is arranged such that the sound energy generated by the flow of gaseous fluid from the nozzle 720 is launched into the liquid flowing through the pipe 760. In the embodiment shown the pipe may 760 provide at least a portion of a column of a gas lift pump apparatus.

Furthermore, in the embodiment shown the flow of gaseous fluid through the device 700 is arranged such that gaseous fluid emanating from the nozzle 720 ultimately flows into the pipe 760 thereby causing pumping of fluid in the pipe 760 by gas lift. To this end, apertures 741, 742 are provided in a wall of the pipe 760 to allow gaseous fluid to flow into the pipe 760. In some alternative embodiments the gas is not arranged to pass into the conduit 760, but may be recycled through the nozzle 720 or vented to atmosphere. Other arrangements are also useful.

It is to be understood that, alternatively or in addition, gaseous fluid may be introduced into the pipe 760 by alternative means, such as a conventional gaseous fluid injector not being arranged to generate sonic energy.

It is to be understood that a position of the receptor member 730 and nozzle 720 with respect to a length of the pipe 760 may be important in some embodiments in order to enable or enhance the launching of the sonic energy into the pipe 760.

It is to be understood that in some embodiments the Poisson effect may be exploited in order more efficiently to couple sonic energy into liquid in the conduit 760. This may be accomplished by clamping the conduit 760 rigidly at positions of the conduit 760 that are at distances from the device 700 corresponding to odd multiples of one quarter of the wavelength of the sonic energy generated by the device 700. Other arrangements are also useful.

It is to be understood that the length and diameter of the conduit 760, the dimensions of the nozzle and receptor member configuration and the flow rate of fluid through the nozzle may be arranged to generate a desired frequency of sonic energy to optimise killing of ANS.

It is to be understood that multiple devices 700 may be provided at locations along a given conduit 760 or around a conduit 760. Multiple gas vents allowing gas to flow into the conduit 760 may be provided around the conduit 760 in some arrangements.

Furthermore, in some embodiments of the invention the gaseous fluid delivered by the fluid delivery device is arranged to reduce survival of ANS and/or kill ANS. By the term 'reduce survival' is meant that ANS may be rendered more likely to die, either by hypercapnia, hypoxia, a combination of both, or by a further survival reducing process.

It is to be understood that in order to reduce the concentration of a given gas component in a liquid, a partial pressure of that gas component in gas that is in contact with the liquid (for example by being bubbled through the liquid) must be such that the partial pressure of the gas component in the liquid is higher than the partial pressure of the gas component in the gas. This pressure difference forces gas molecules through the liquid/gas interface into the gas bubble.

Thus if a gas having a lower oxygen content than the liquid is bubbled through the liquid (for example substantially zero oxygen), a concentration of oxygen in the liquid will be reduced. If a gas having a higher carbon dioxide content than the liquid is bubbled through the liquid, a concentration of carbon dioxide in the liquid may increase. Suitable gases for increasing carbon dioxide concentration and reducing oxygen concentration (relative to an equilibrium concentration of carbon dioxide and oxygen in the liquid when in contact with air) include combustion gases, for example ships flue gases or gas generated by an inert gas generator, for example of the Holec type.

Figure 8:
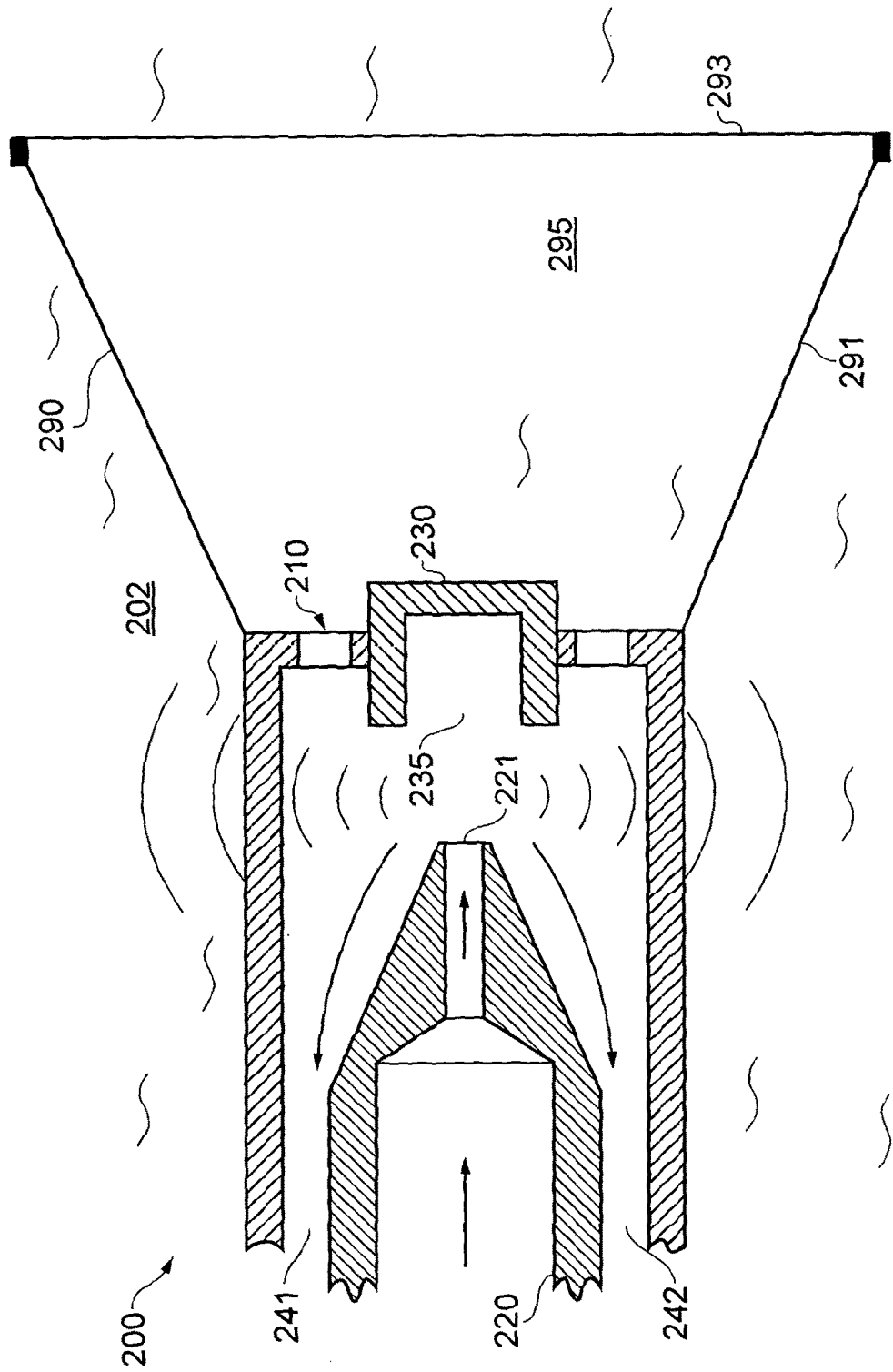
FIG. 8 is a cross-sectional schematic illustration of a fluid delivery device according to a still further embodiment of the invention arranged to generate sonic energy by a flow of gas therethrough.

FIG. 8 is a schematic cross-sectional illustration of the fluid delivery device of FIG. 2 fitted with an amplification chamber 290. The chamber 290 has a substantially frusto-conical body portion 291 having a flexible membrane 293 arranged to define a wall of the amplification chamber 290 at a basal (wider) end of the body portion 291.

At an opposite end of the amplification chamber 290 the chamber 290 is coupled to the device 200 such that an external surface of the receptor member 230 forms a portion of an apical wall of the chamber 290. Thus, the device 200 is arranged to direct sonic energy directly into the amplification chamber 290. It is advantageous to minimise any restriction to flow of gas into the chamber 290. In the embodiment shown the receptor member 230 is supported by an open frame structure 210 that allows gas emerging from the nozzle 220 or receptor member 230 to flow into the amplification chamber 290.

In the embodiment of FIG. 8 the amplification chamber 290 is shown having a substantially frusto-conical shape. It is to be understood that other shapes are also useful, for example a logarithmic increase in cross-sectional area as a function of distance from the nozzle 220/receptor 230. A wall profile of the chamber 290 may follow a logarithmic curve. In use the chamber 290 enables an increase in the amplitude of sonic energy launched into liquid 202 in which the device 200 and chamber 290 are immersed. In some embodiments this is at least in part because the amplification chamber 290 is arranged to reduce a mismatch in impedance between the device 200 and the liquid 202 thereby more efficiently to communicate energy from the device 200 to the liquid 202.

The amplification chamber 290 of the embodiment shown is formed from a metallic material. It is to be understood that other materials are also useful including plastics materials.

Figure 9:
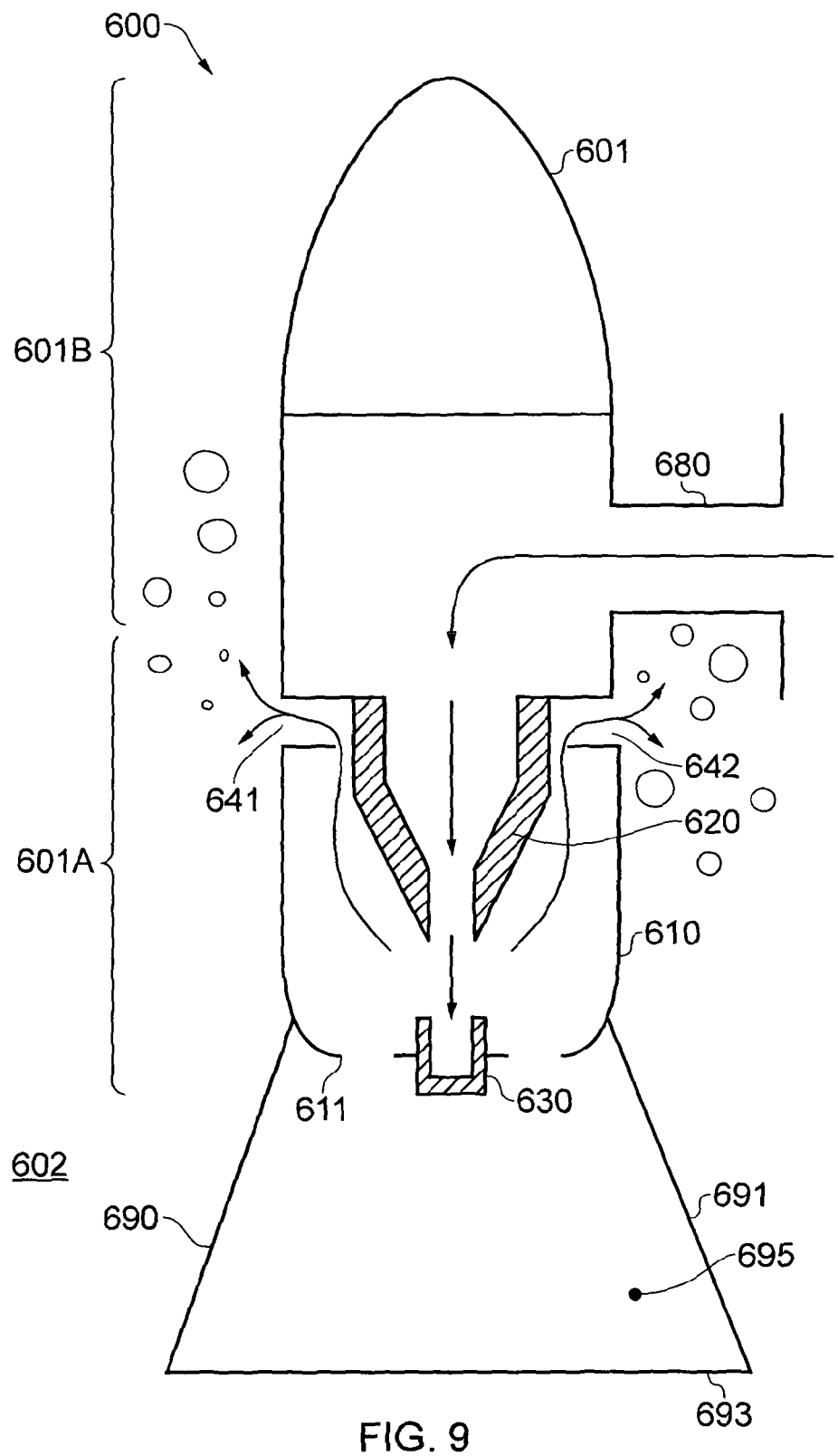
FIG. 9 is a schematic illustration of a fluid delivery device according to an embodiment of the invention arranged to generate sonic energy by a flow of gas therethrough.

FIG. 9 is a schematic illustration of a fluid delivery device 600 according to the embodiment of FIG. 6 fitted with an amplification chamber 690 similar to that of the embodiment of FIG. 8.

The chamber 690 is fitted to the device 600 so as to enclose the receptor member 630 such that the receptor member 630 provides a portion of a wall of the chamber 690. Thus the device 600 is arranged to direct sonic waves directly into the chamber 690 which in turn directs the waves into the surrounding liquid medium 602.

In use the amplification chamber 690 is oriented substantially normal to a flow direction of liquid pumped. Gas emerging from outlets 641, 642 therefore rises out of the plane of the figure, in use.

Figure 10:
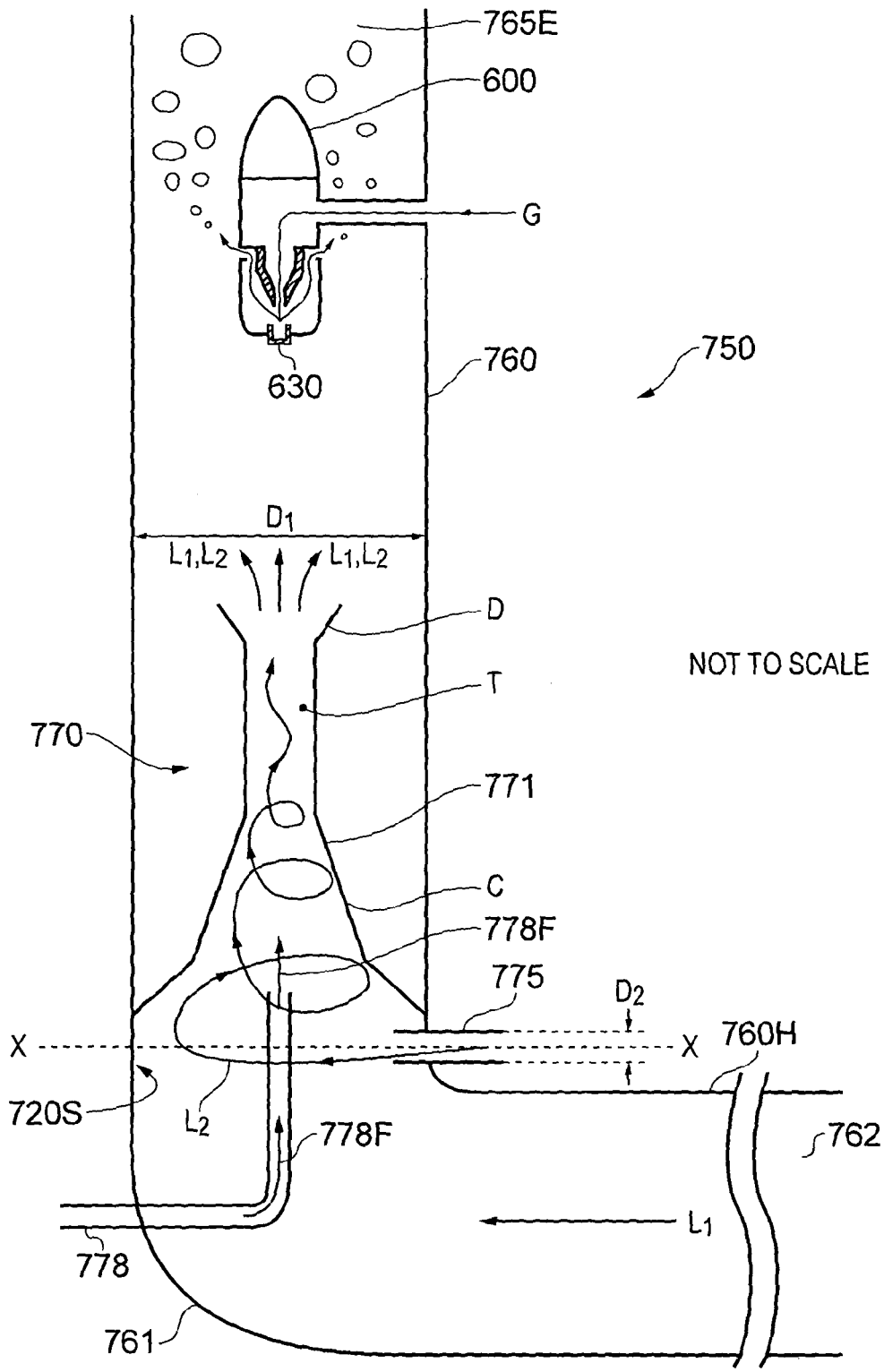
FIG. 10 is a cross-sectional schematic illustration of a gas lift pump apparatus according to an embodiment of the invention provided with a fluid delivery device according to the embodiment of FIG. 6.

FIG. 10 is a schematic illustration of gas lift pump apparatus 750 according to a further embodiment of the invention. Like features of the embodiment of FIG. 10 to those of the embodiment of FIG. 1 are shown with like reference signs prefixed numeral 7 instead of numeral 1.

The apparatus 750 has a column 760 in the form of a substantially hollow tube member provided in a substantially upright orientation within a ballast tank (not shown).

In the embodiment shown, at a lower end of the column 760 a bend portion 761 is provided that couples the lower end of the column 760 to a draw tube or intake tube 760H that projects laterally away from a longitudinal axis of the column 760. The draw tube 760H has a liquid inlet 762 at a free end thereof. The column 760 has a liquid outlet aperture 765E at an upper free end thereof. It is to be understood that the draw tube 760H may be considered to be part of the column 760, and therefore the column may be described as a substantially L-shaped liquid column 760 similar to that of the apparatus 550 of FIG. 5.

A fluid delivery device 600 of the type shown in FIG. 6 is provided in the column 720 and oriented as shown, with receptor member 630 provided at an upstream end of the device 600.

The apparatus 750 has a microbubble generator 770 upstream of the fluid delivery device 600. In the embodiment of FIG. 10 the microbubble generator 770 is positioned below the fluid delivery device 600.

Figure 11:
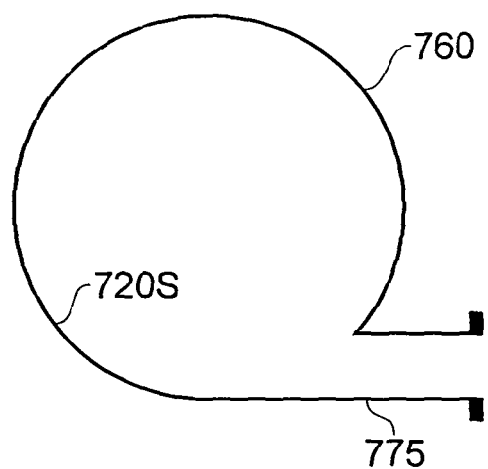
FIG. 11 is a cross-sectional view of a column of the gas lift apparatus of FIG. 10 at X-X showing the orientation of a tangential fluid injection port.

The generator 770 has a venturi portion 771 having the shape of a conventional venturi device. In the embodiment of FIG. 11 the venturi portion 771 is arranged such that liquid flowing through the column 760 is forced to flow through the venturi portion 771. The venturi portion has a converging portion C arranged to direct the liquid through a throat portion T and subsequently through a diverging portion D in the conventional manner.

A liquid injector 775 is arranged to inject a flow of liquid $L_2$ into the column 760 upstream of the venturi portion 771. A cross-sectional view of the column 760 at position X-X is shown in FIG. 11.

It can be seen that the liquid injector 775 is configured to inject liquid $L_2$ into the column 760 in a direction substantially tangential to an inner surface 760S of the column 760 such that the liquid L2 has a component of velocity in a tangential direction within the column 760. This causes liquid flowing up through the column 760 to swirl in substantially one direction.

It is to be understood that the fluid will also have a component of velocity in an axial direction along the column 760 as it moves up through the column 760. Thus, the injector 775 is arranged to promote the establishment of a flow vortex within the column 760.

A gas injector 778 is arranged to inject a flow of gas 778F into the column 760 upstream of the venturi portion 771. In the embodiment shown the gas injector 778 is arranged to inject the gas at a position downstream of the liquid injector 775. As the gas rises it causes liquid to be drawn into the draw tube 760H at a free end thereof distal the substantially vertical column 760. The liquid is drawn through the draw tube 760H and up through the column 760.

The apparatus 750 is arranged such that as liquid from the liquid injector 775 and gas from the gas injector 778 enter the venturi portion 771 microbubbles are generated. The microbubbles act as sites to which bacterial ANS within the liquid may become attached.

Figure 12:
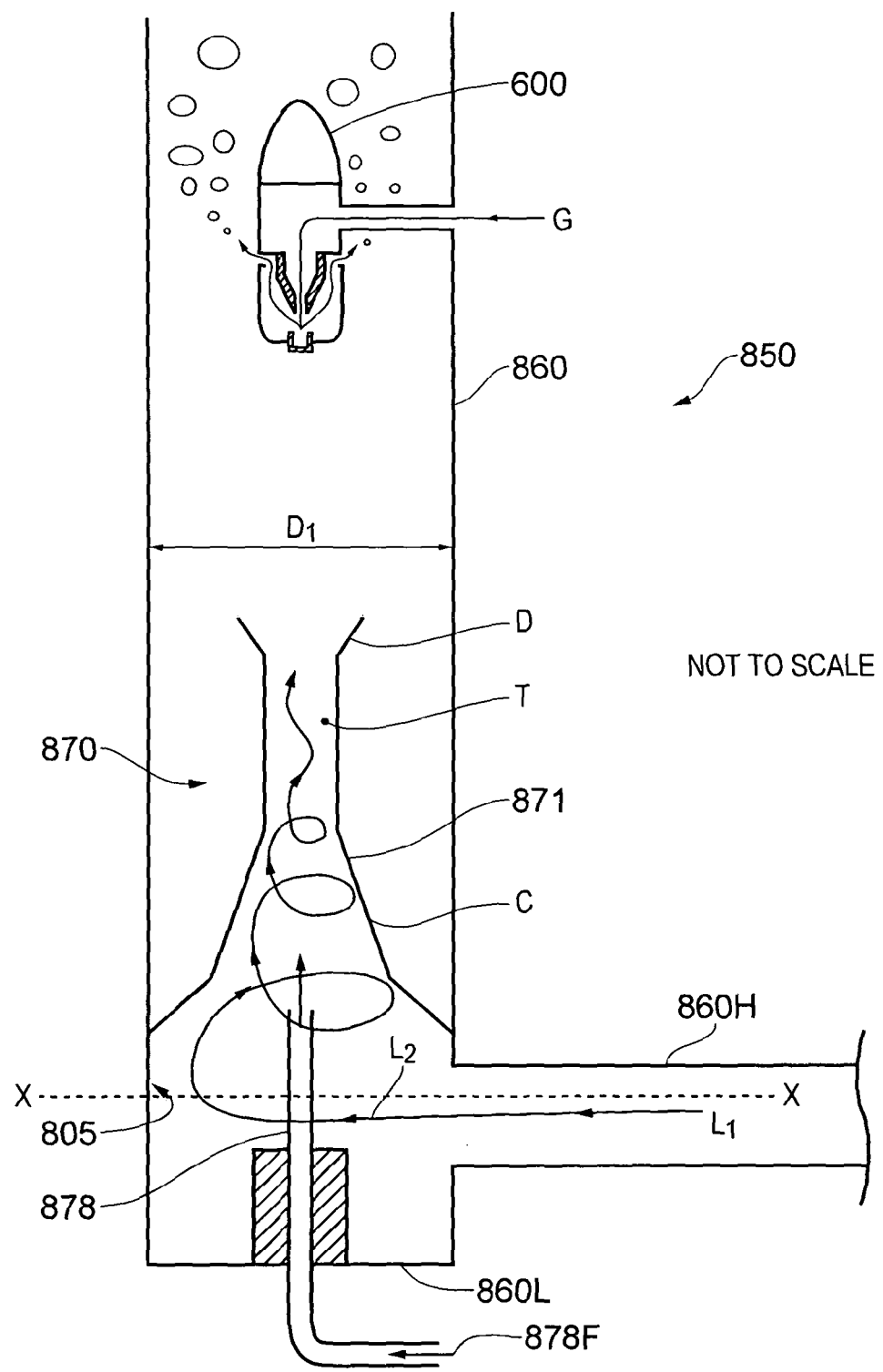
FIG. 12 is a cross-sectional schematic illustration of a gas lift pump apparatus according to a further embodiment of the invention provided with a fluid delivery device according to the embodiment of FIG. 6.

A probability of death of bacterial ANS by sonic energy produced by the fluid delivery device 600 is increased by the formation of the microbubbles. This is at least in part because the sonic energy can cause violent rupture of the microbubbles causing generation of shockwaves such as ultrasonic shockwaves thereby causing damage and death to bacterial ANS trapped by a microbubble.

In some embodiments the column 760 has a diameter of around 8 inches (around 20 cm) and the liquid injector 775 has a diameter of around 2 inches (around 5 cm).

In some embodiments the fluid delivery device 600 may be supplied with a gas flow rate of around 50 normal $m^3/h$ at a pressure of around 3.5-4.0 bar gauge (350-400 kPa).

Other values of one or more dimensions and/or one or more operating parameters are also useful in some embodiments.

It is to be understood that some embodiments of the invention employing a microbubble generator 770 are operable more efficiently to destroy bacterial ANS. Furthermore, some embodiments of the invention employing an amplification chamber 690 are also operable more efficiently to destroy bacterial ANS.

FIG. 12 is a schematic illustration of gas lift pump apparatus 850 according to a further embodiment of the invention. Like features of the apparatus of FIG. 12 to those of the apparatus of FIG. 10 are labelled with identical reference signs or like reference signs prefixed numeral 8 instead of numeral 7.

The apparatus 850 is similar to that of FIG. 10 except that liquid can only enter the column 860 by means of the draw tube 860H, i.e. no liquid injector 775 fed by a pressurised liquid source is provided in addition to the draw tube 860H.

In the embodiment of FIG. 12, liquid passing through the draw tube 860H is arranged to enter the column 860 in a direction tangential to a wall of the column 860 thereby to induce swirl in liquid rising through the column 860.

In the embodiments of FIG. 10 and FIG. 12 all liquid flowing up the columns 780, 860 from below the venturi portions 771, 871 flows through the venturi portions 771, 871. In some embodiments some liquid is able to bypass the venturi portion (see for example the embodiment of FIG. 15 described below).

FIG. 13(*a*) is a perspective view of a microbubble generator 970 suitable for use with embodiments of the present invention.

The generator 970 has a body portion 970B having a liquid inlet 975 and a gas injector 978 at one end, arranged to allow liquid and gas, respectively, to enter an internal fluid conduit 973 of the generator 970. The conduit 973 is substantially circular in cross-section, the liquid inlet 975 being arranged to allow liquid into the conduit 973 along a direction substantially tangential to an inner wall of the conduit 973 as viewed along a longitudinal axis of the conduit 973 similar to the arrangement of FIG. 11. This is so as to promote establishment of a liquid flow vortex as the liquid passes along the conduit 973 towards a venturi portion 971. Establishment of the flow vortex may promote shearing of the gas and liquid and therefore shearing of bubbles entrained in the liquid, promoting formation of microbubbles.

The generator 970 is operable to generate microbubbles in the liquid as the liquid and gas pass through the venturi portion 971. Thus a flow of liquid having microbubbles entrained therein may be provided from a fluid outlet 972 of the generator 970.

It is to be understood that the generator 970 and a fluid delivery device according to an embodiment of the invention (see for example the devices of FIGS. 2, 3 and 6 to 9) may be employed either in gas lift pump apparatus or separately in a ballast tank, a fluid conduit or any other suitable location.

In some embodiments the fluid outlet 972 faces in a vertically upwards direction and is arranged to direct microbubbles towards a fluid delivery device configured to launch sonic waves into liquid flowing through the column of a gas lift pump apparatus such as a gas lift pump apparatus similar to that of FIG. 12. It is to be understood that the generator 970 may be arranged to form part of the column of gas lift apparatus in a similar manner to which the generator 870 of the embodiment of FIG. 12 forms part of the column. The liquid inlet 975 may be coupled to a draw tube in a similar manner to the apparatus of FIG. 12. In some embodiments the liquid inlet 975 may be substantially the only liquid through which liquid enters a lower end of the column.

Figure 14:
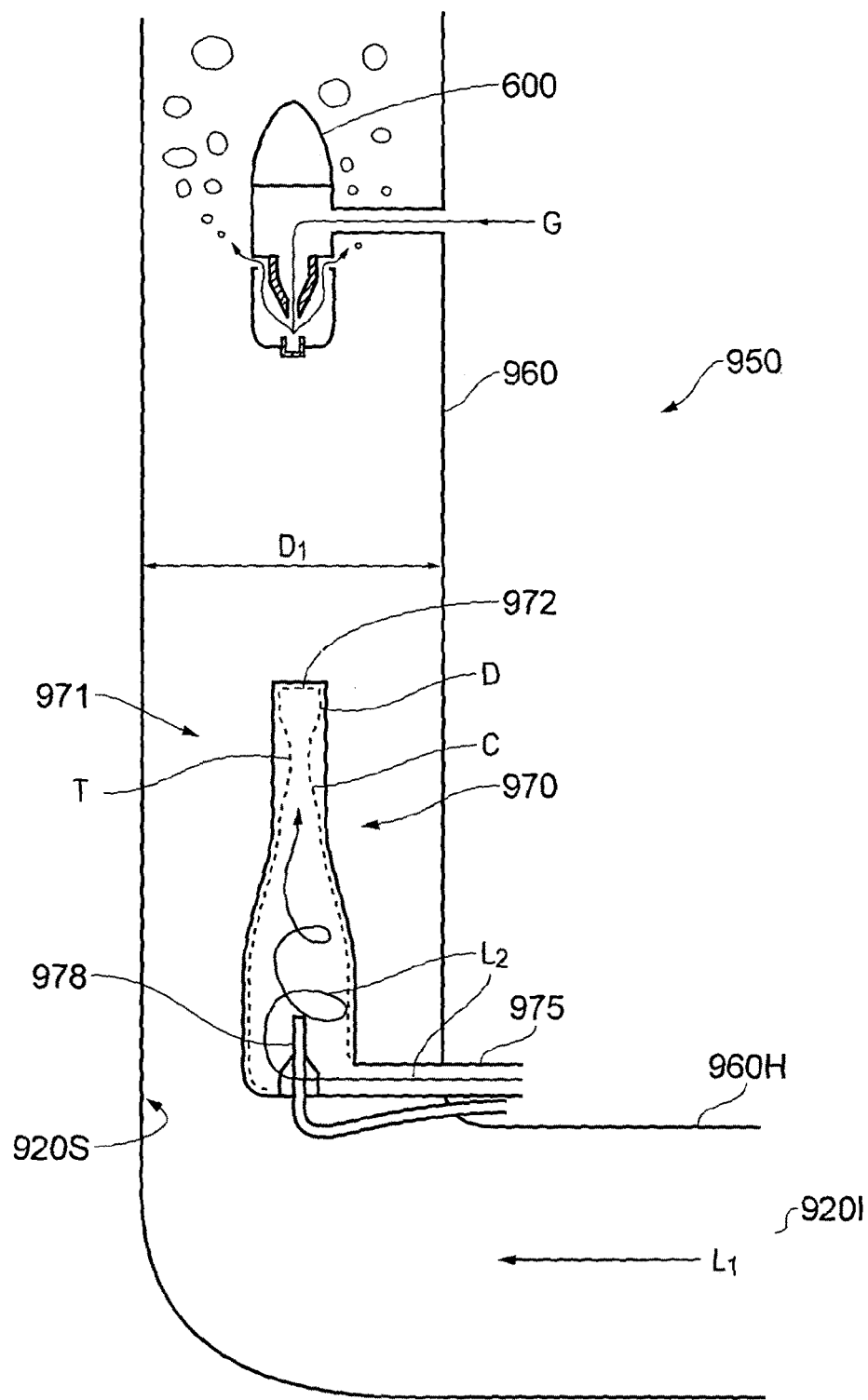
FIG. 14 shows gas lift pump apparatus according to an embodiment of the invention having the generator of FIG. 13 and a fluid delivery device according to the embodiment of FIG. 6.

FIG. 14 shows an embodiment of the invention in which a fluid delivery device 600 is provided in a column 960 of a gas lift pump apparatus 950. Like features of the apparatus of FIG. 14 to those of the apparatus of FIG. 10 are labelled with identical reference signs or like reference signs prefixed numeral 9 instead of numeral 7.

Figure 13C:
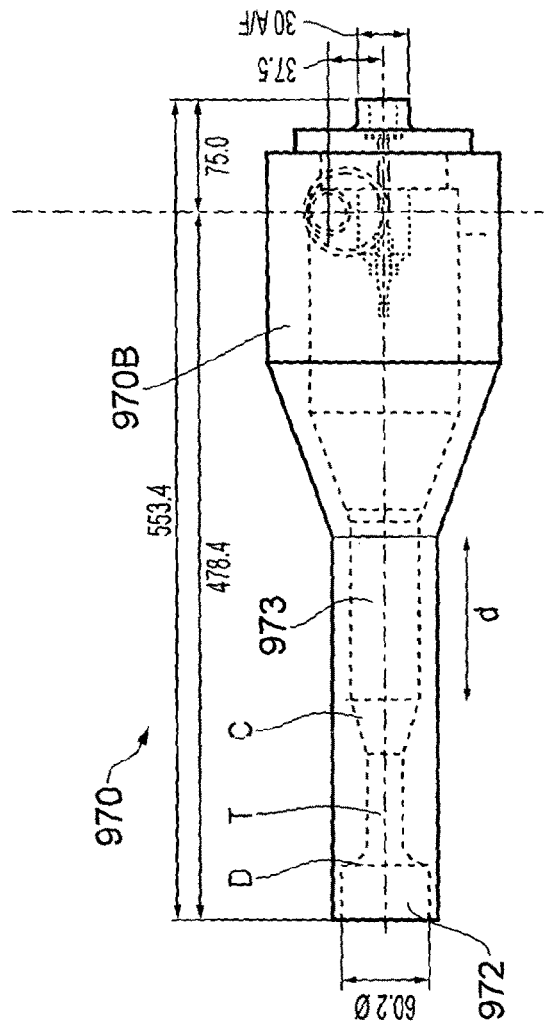
FIG. 13 shows a microbubble generator suitable for use in some embodiments of the invention in (a) perspective view with cutaway, (b) side view, (c) front view and (d) top view.
Figure 13D:
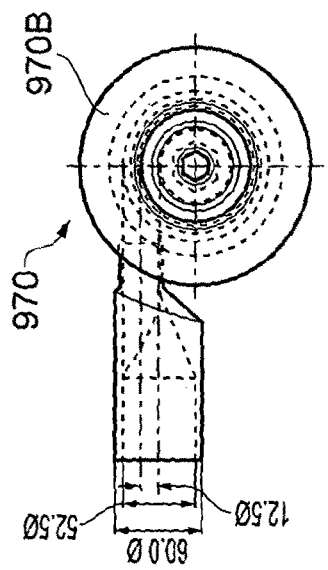

A microbubble generator 970 similar to that described above and illustrated in FIG. 13 is mounted within the column 960 of the apparatus 950.

The generator 970 is operable to inject a flow of liquid $L_2$ in which microbubbles are entrained into the column 960 via outlet 972 and towards the fluid delivery device 600. It is to be understood that the apparatus 950 is also operable to pump liquid $L_1$ through the column from a draw tube 960H by gas lift, by means of gas injected into the column via the fluid delivery device 600, as well as by a pressure of liquid injected into the column 960 via liquid injector 975.

It is to be understood that injection of gas into the column 960 in the form of microbubbles by means of gas injector 978 may also assist in pumping liquid $L_1$ through the column 960 by gas lift. Gas bubbles are formed within the generator 970 in liquid injected by injector 975 as gas is injected by injector 978. A size of the bubbles is reduced by shear forces experienced as the liquid flows through the venturi (or choke) portion 971, whereby microbubbles are formed.

It is to be understood that other arrangements are also useful in which a microbubble generator 970 provides a flow of entrained microbubbles to a fluid delivery device 600. Embodiments of the invention are operable to kill bacterial ANS as well as non-bacterial ANS.

In the embodiment of FIG. 14 the generator 970 is shown positioned in the flowstream of liquid L1 from the draw tube 960H. The generator 970 may alternatively be provided at a base of a column 960 having a closed lower end, such as the end 860L of the column 860 of the embodiment of FIG. 12.

Figure 15:
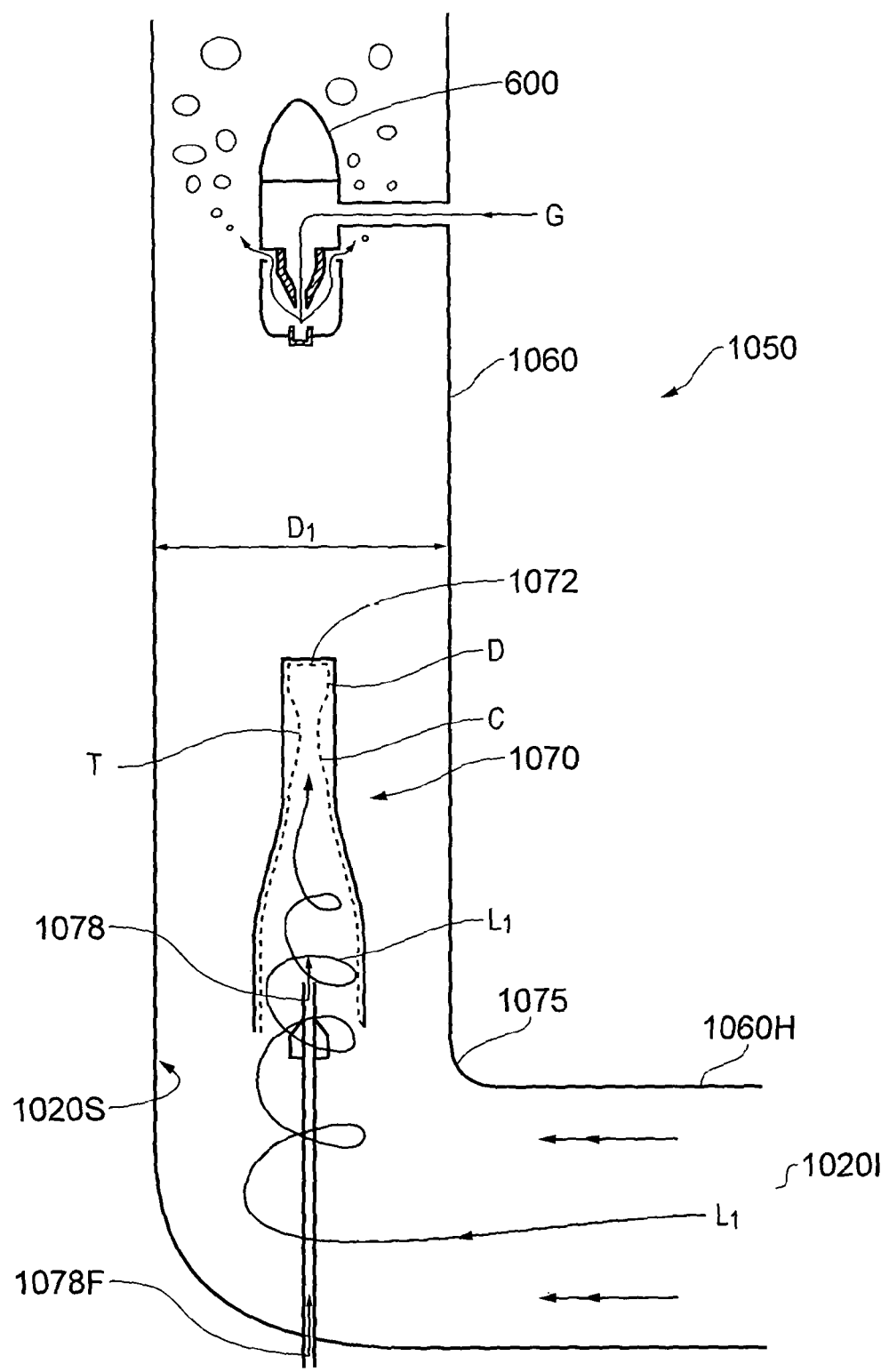
FIG. 15 shows gas lift pump apparatus according to a further embodiment of the invention having the fluid delivery device of the embodiment of FIG. 6.

FIG. 15 is a schematic illustration of gas lift pump apparatus 1050 according to a further embodiment of the invention. Like features of the apparatus of FIG. 15 to those of the apparatus of FIG. 14 are labelled with like reference signs prefixed numerals 10 instead of numeral 9.

The apparatus 1050 of FIG. 15 is similar to that of FIG. 14 in that it has a substantially L-shaped gas lift column 1060 having a fluid delivery device 600 provided therein. It is to be understood that apparatus according to embodiments of the invention may have any number of fluid delivery devices 600 provided therein.

The apparatus 1050 has a microbubble generator 1070 provided upstream of the fluid delivery device 600 and within the column 1060. The generator 1070 is similar to that of the embodiment of FIG. 14 except that the generator 1070 does not have a liquid injector 975. Instead, an upstream end of the generator 1070 is arranged to receive a flow of liquid L1 entering the column 1060 through draw tube 1060H. In the embodiment shown the upstream end of the generator 1070 is also the lowermost end thereof. It can be seen that a portion of the liquid $L_1$ entering the column 1060 from the draw tube 1060H flows around an outside of the generator 1070. However a portion of the liquid flows through the generator 1070. In some embodiments substantially all of the liquid L1 flows through the generator 1070.

A flow of gas 1078F is provided through the generator 1070 by means of a gas injector 1078. The generator 1070 is arranged such that as liquid $L_1$ flows therethrough microbubbles are formed in the liquid $L_1$.

In the embodiment shown the column 1060 is arranged to introduce swirl into the liquid L1 once it has entered the column 1060 from the draw tube 1060H. Swirl may be useful in encouraging the formation of microbubbles in the flow of liquid $L_1$ through the generator 1070 as discussed above. Swirl is developed by introducing the liquid into the column 1060 in a direction tangential to an interior of a sidewall of the column 1060 in a similar manner to that described above.

In some alternative embodiments the generator 1070 is arranged to introduce swirl in liquid entering the generator 1070. For example, flow deflectors may be provided around the injector 1078 or other portion of the generator 1070 such as an inner wall of the generator 1070 to induce swirl in liquid L1 entering the generator 1070.

Figure 16:
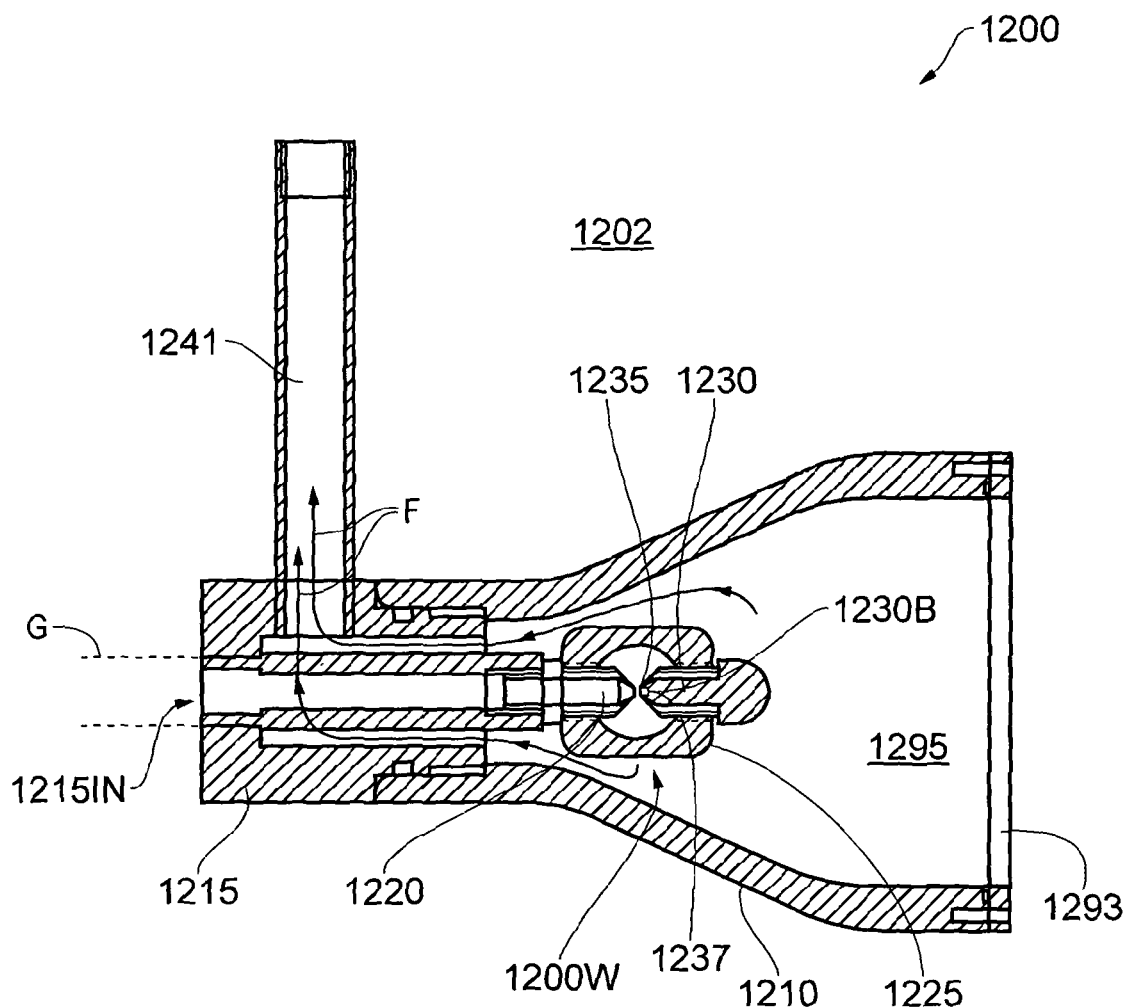
FIG. 16 is a cross-sectional view of a sonic energy generation device according to a further embodiment of the invention.

FIG. 16 shows a fluid delivery device 1200 according to a further embodiment of the invention. The device has a chamber 1210 in the shape of a horn, the chamber 1210 being coupled to a gas supply head 1215. The supply head 1215 has a gas inlet 1215IN arranged to be coupled to a gas supply line G shown in dashed outline.

The head 1215 is arranged to deliver a flow of gas to a whistle portion 1200W within the chamber 1210. The whistle portion 1200W has a nozzle member 1220 and a whistle body 1225 coupled to the nozzle member 1220. The whistle body 1225 is arranged to support a receptor member 1230 in a substantially fixed spaced apart and substantially coaxial relationship with the nozzle member 1220. The whistle body 1225 is in the form of a substantially open frame structure thereby to reduce an amount of sound energy absorbed thereby when the whistle member is in use.

The nozzle member 1220 is arranged to direct a flow of gaseous fluid through an opening 1235 of the receptor member 1230 into an open cavity 1237 defined by the receptor member 1230. The receptor member 1230 is arranged to be screwed into a tapped aperture in the whistle body 1225 thereby to couple the receptor member 1230 to the whistle body 1225.

A distance between the opening 1235 of the receptor member 1230 and nozzle 1220 may therefore be adjusted by means of the screw thread by rotation of the receptor member 1230.

In some arrangements a depth D of the cavity defined by the receptor member 1230 may be adjusted. In some arrangements the adjustment is by means of a further screw adjustment, for example by adjusting a position of a screw defining at one end an interior basal surface of the cavity. This feature has the advantage that an amount of sound energy produced by the device 1200 may be optimised. A frequency of sound energy (i.e. a frequency of sound waves generated by the device 1200) may also be adjusted.

As noted above the chamber 1210 is in the shape of a horn. A cross-sectional area of the chamber 1210 increases as a function of distance from the nozzle member 1220 in a direction away from the gas supply head 1215. The cross-sectional area increases to a maximum size (corresponding to a position of maximum diameter of the chamber 1210) and merges with a portion of the chamber 1210 having substantially constant cross-sectional area as a function of distance from the nozzle member 1220. A diaphragm or membrane 1293 is provided at the end of the horn-shaped chamber 1210 and provides a wall of the chamber 1210 to communicate sound energy into liquid surrounding the chamber 1210.

The device 1200 is provided with a gas outlet conduit 1241 through which gas that has been injected into the chamber 1210 may be vented, as shown by arrows F.

In some embodiments including the embodiment shown in FIG. 16 the gas is vented into the column of gas lift pump apparatus in which the device 1200 is installed. In some embodiments the gas is vented to an alternative location such as to atmosphere. A volume 1295 of gas within the chamber 1210 is arranged to couple sonic energy in the form of sonic waves generated by the whistle portion 1200W into liquid 1202 external to the device 1200 by means of the diaphragm 1293 as well as by transmission of sonic energy through the wall of the remainder of the chamber 1210.

FIG. 17 shows a fluid delivery device 1300 according to a further embodiment of the present invention. The device 1300 is relatively simple in construction, not having an amplification chamber having a membrane for communicating sonic energy into liquid external to the device 1300. Rather, the device 1300 has a chamber 1310 formed substantially entirely from stainless steel although other materials are also useful.

Figure 17A:
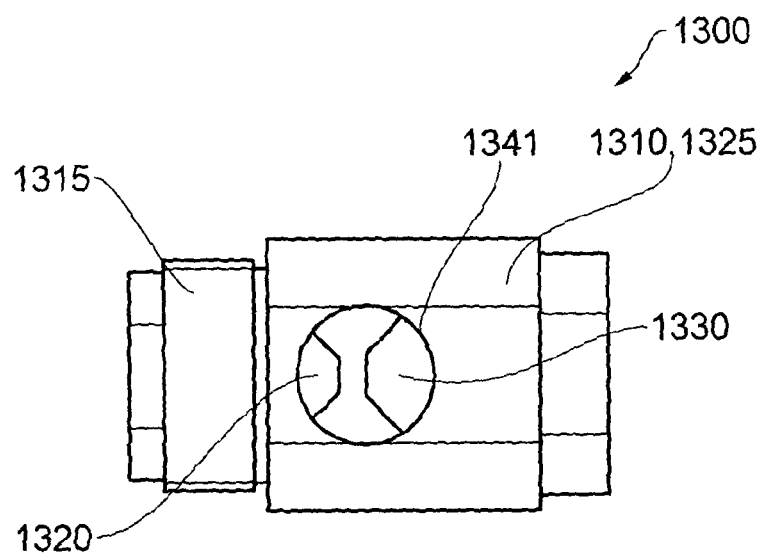
FIG. 17 shows a fluid delivery device arranged to generate sonic energy by a flow of gas therethrough according to a further embodiment of the invention in (a) side view and (b) cross-sectional side view.
Figure 17B:
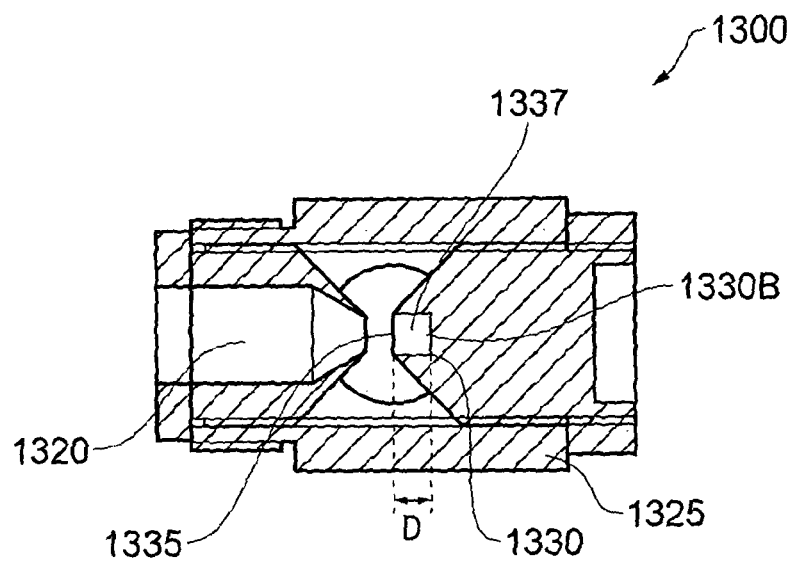

FIG. 17 (a) is a side view of the device 1300 whilst FIG. 17(b) is a cross-sectional view along the same viewing direction as FIG. 17(a).

The device has a chamber 1310 that also provides a whistle body 1325. A nozzle member 1320 and a receptor member 1330 are coupled to the whistle body 1325 in a similar manner to the embodiment of FIG. 16 described above.

The whistle body 1325 provides a substantially tubular sleeve coaxial with the nozzle member 1320 and receptor member 1330. In contrast, in the embodiment of FIG. 16 the whistle body 1225 is in the form of a substantially open frame within a larger chamber 1210 rather than in the form of a sleeve. The open frame arrangement may reduce absorption of sound energy by the whistle body 1225 as described above.

The receptor member 1330 is arranged to close one end of the chamber 1310. Apertures 1341 are formed in a wall of the chamber 1310 to allow gas that flows into the device 1300 from the nozzle 1320 to flow out from the device 1300.

FIG. 18 shows a portion of a column 1360 of gas lift pump apparatus according to an embodiment of the invention in (a) side view and (b) plan view. The column 1360 has two gas inlets GA, GB each arranged to deliver a flow of gas into a corresponding gas conduit 1305A, 1305B projecting into the column 1360 normal to a cylinder axis thereof.

Each conduit 1305A, 1305B has four gas delivery devices 1300 T-connected thereto and projecting upwardly, and four gas delivery devices T-connected thereto and projecting downwardly.

In the embodiment of FIG. 18, for each conduit 1305A, 1305B the devices 1300 projecting upwardly are each paired with a corresponding device 1300 projecting downwardly such that paired devices are substantially coaxial with one another. Their common axes are substantially parallel to a cylinder axis of the column 1360. This feature has the advantage that drag induced on a flow of fluid through the column 1360 may be reduced since a projected area of the sixteen devices 1300 in a plane normal to the cylinder axis of the column 1360 is reduced relative to non-coaxial positioning of the devices 1300.

As described above, in the arrangement shown in FIG. 18 the column 1360 is provided with sixteen fluid delivery devices 1300. It is to be understood that a larger or smaller number of devices 1300 may be employed in some embodiments.

Figure 19:
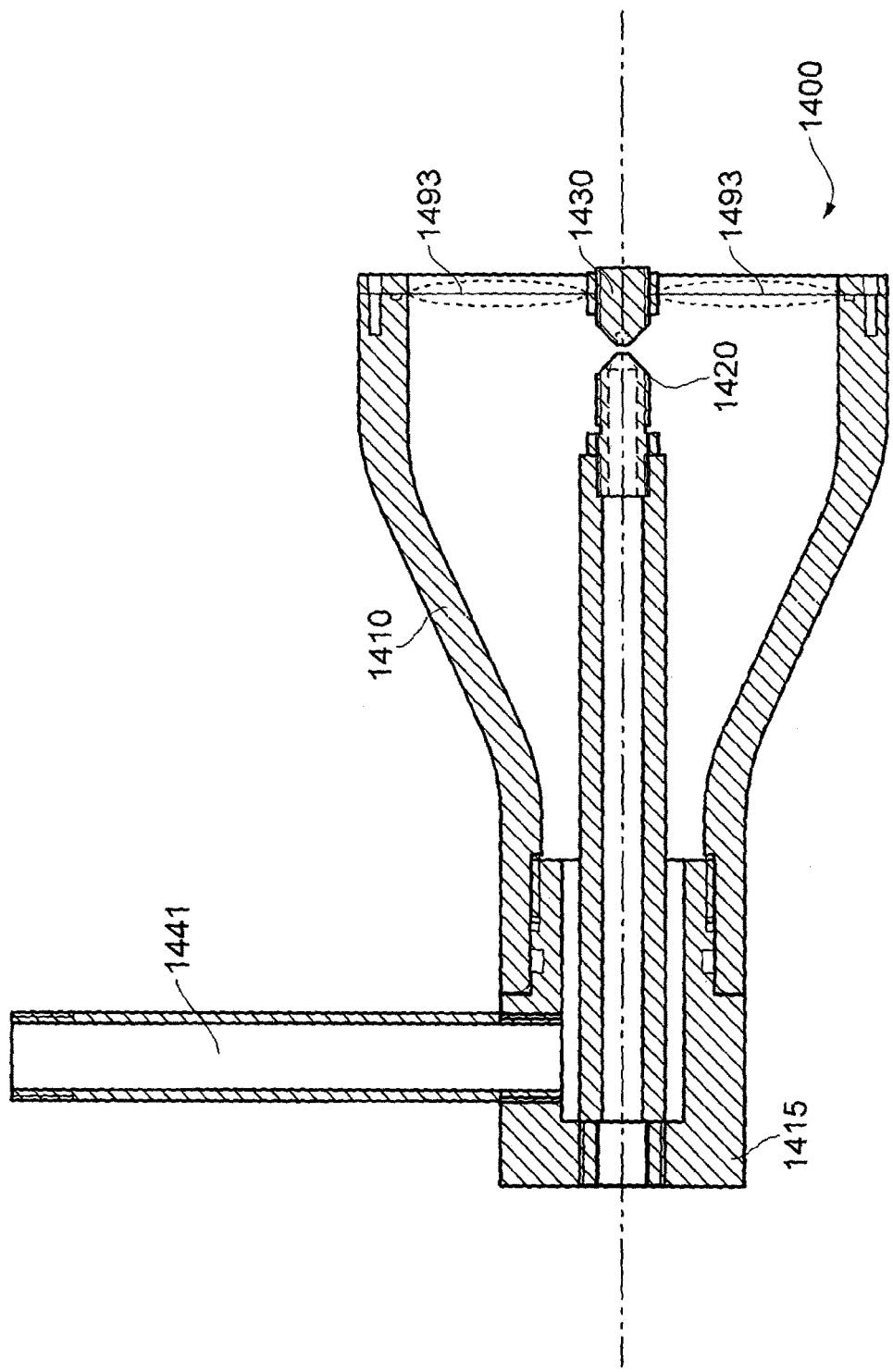
FIG. 19 shows a cross-sectional view of a fluid delivery device arranged to generate sonic energy by a flow of gas therethrough according to a further embodiment of the invention.

FIG. 19 shows a fluid delivery device 1400 according to an embodiment of the invention similar to that shown in FIG. 16. Like features of the embodiment of FIG. 19 to that of the embodiment of FIG. 16 are shown with like reference signs prefixed numerals 14 instead of numerals 12.

In the embodiment of FIG. 19 a receptor member 1430 is coupled directly to a diaphragm 1493 and is arranged to be movable therewith. It is to be understood that a distance between a nozzle member 1420 and receptor member 1430 may vary as the diaphragm 1493 vibrates. However if the diaphragm 1493 is arranged to vibrate at certain prescribed frequencies, at which the location of the receptor member 1430 defines a node, movement of the receptor member 1430 will be substantially reduced. In the configuration shown in FIG. 21 the diaphragm 1493 is shown vibrating at such a frequency, the receptor member 1430 remaining substantially stationary as the diaphragm 1493 vibrates. Instantaneous positions of the diaphragm 1493 at opposite extrema of deflection thereof during operation of the device at a particular frequency are shown in dashed outline in FIG. 19.

Figure 20:
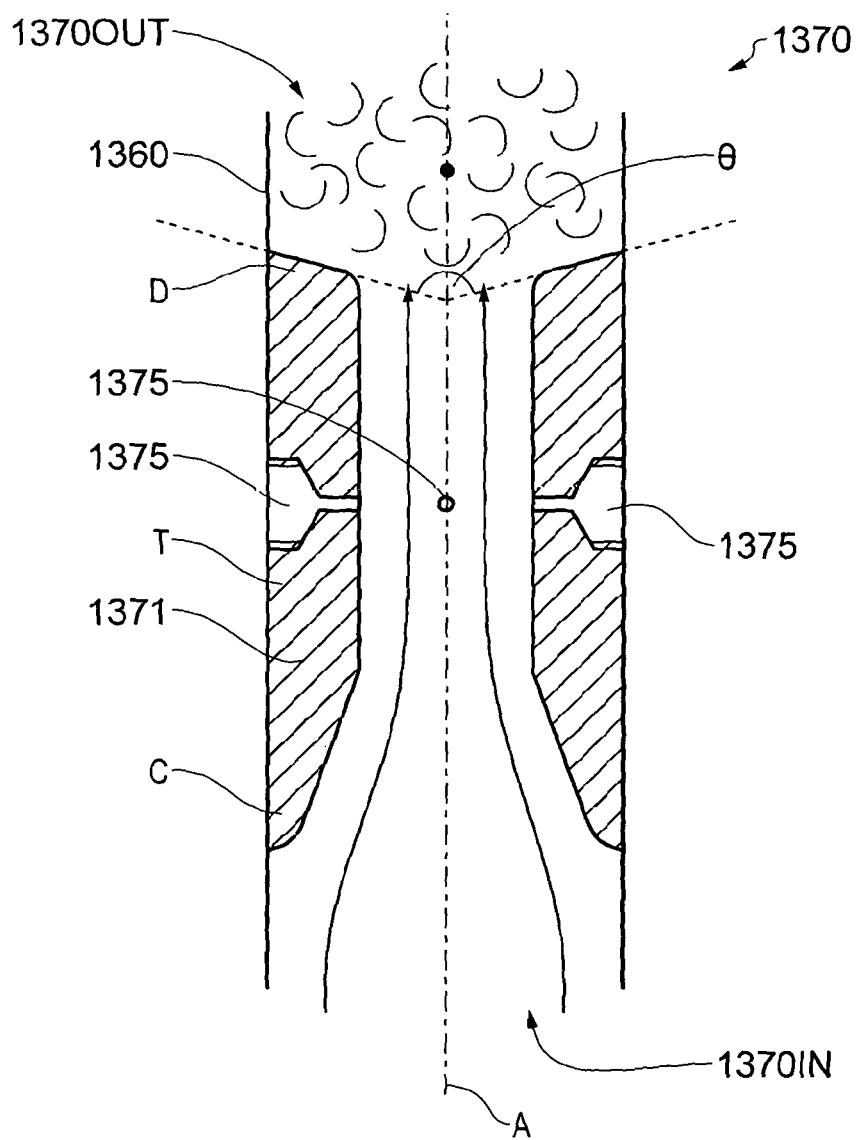
FIG. 20 shows a side view of a choke tube (or Venturi) microbubble generator according to an embodiment of the invention.

FIG. 20 shows a microbubble generator 1370 according to a further embodiment of the present invention. The generator 1370 is shown installed in a section of the column 1360 of the gas lift pump apparatus of FIG. 18 upstream of the fluid delivery devices 1300. The generator 1370 is arranged to deliver a flow of microbubbles to the devices 1300. It is to be understood that in some arrangements the generator 1370 may be arranged to inject microbubbles from an outlet 1370OUT thereof into the column 1360 such that microbubbles are directed into a flowstream of liquid through the pump apparatus.

The generator 1370 has a liquid inlet 1370IN and liquid outlet 1370OUT at opposed ends thereof. Liquid passing through the inlet 1370IN passes through a choke portion 1371 having a converging portion C, a throat portion T and a diverging portion D. It is to be understood that an angle of convergence and an angle of divergence of the converging and diverging portions C, D respectively may be selected so as to optimise performance of the generator 1370. Steeper angles of divergence of the diverging portion D may result in the inducement of greater turbulence in liquid passing through the diverging portion D. In the embodiment shown an included angle of divergence 6 of the diverging portion with respect to a cylinder axis A of the column 1360 is in the range from around 150° to around 160°. Other angles are also useful.

In the embodiment of FIG. 20 the generator 1370 has four gas injectors 1375 arranged in quadrature about the throat portion T and arranged to inject gas into liquid flowing through the throat portion T. Liquid flowing through the throat portion T flows at a velocity greater than that at which it flows into the column 1360 upstream of the generator 1370 as it passes through inlet 1370IN. Thus a shear force of liquid flowing through the throat portion T on gas bubbles entering the throat portion T is enhanced relative to injection of gas into the column 1360 in the absence of a throat portion. This results in the formation of smaller bubbles than would be formed if the bubbles were injected into liquid upstream of the generator 1370. Furthermore, gas bubbles formed in the throat portion T pass into the diverging portion D where turbulence is induced in the liquid. This results in the application of severe shear forces to the bubbles. This further reduces a size of the bubbles before they are exposed to the sonic waves generated by the fluid delivery devices 1300.

FIG. 21 shows a cyclone (or 'cyclonic') microbubble generator 1570 arranged to induce swirl in liquid passing into a column of a gas lift pump apparatus according to an embodiment of the invention in order to promote formation of microbubbles in the liquid.

Like features of the generator of FIG. 21 to those of the generator of FIG. 20 are shown with like reference signs prefixed numerals 15 instead of numerals 13. As in the case of the embodiment of FIG. 20 (and in contrast to the embodiment of FIG. 13), in the embodiment of FIG. 21 gas is arranged to be injected into the generator in a throat portion T of a Venturi portion V of the generator 1570.

FIG. 21(*a*) is a cross-sectional view of the generator 1570 as viewed normal to a cylinder axis A of the generator 1570. FIG. 21(*b*) is a view along the cylinder axis A as viewed along the direction of arrow B.

The generator 1570 is arranged to form a connection between a column of a gas lift pump apparatus and a draw tube oriented substantially orthogonal to the column although other arrangements are also useful. Liquid outlet 1570OUT is arranged to face in an upward direction and to be coupled to the column. A liquid inlet 1575 is arranged to face in a lateral (substantially horizontal) direction and to be connected to the draw tube. As can be seen from FIG. 21(*a*), liquid entering the generator 1570 through inlet 1575 does so in a direction substantially tangential to an inner wall of the generator 1570 and this feature promotes swirl flow of liquid through the generator 1570.

Liquid flowing through the generator 1570 is forced to flow through a choke or Venturi portion 1571. The Venturi portion has a converging portion C being a portion over which a cross-sectional area of the generator 1570 decreases with distance from the liquid inlet 1575, a throat portion T of substantially constant cross-sectional area and a diverging portion D of increasing cross-sectional area.

Gas inlets 1575 are provided in the throat portion T arranged to inject gas into liquid passing through the throat portion T. The inlets 1575 are provided at spaced apart locations around a circumference of the throat portion T, neighbouring inlets 1575 being substantially equidistant from one another. In the embodiment shown 12 inlets are provided. Other numbers of inlets 1575 and other arrangements of inlets 1575 are also useful.

In use, liquid passing through the Venturi portion 1571 is arranged to cause shear of gas bubbles forming in the liquid as gas is injected through the inlets 1575. This causes a reduction in size of the bubbles compared with an equilibrium size of gas bubbles formed in stagnant liquid. Microbubble generators 1570 of the type shown in FIG. 21 have been found to be highly effective in producing a stable flow of microbubbles.

Reference herein to a vessel includes reference to any boat, ship or other floating structure having at least one ballast tank in the form of a liquid storage tank.

It is to be understood that embodiments of the present invention provide apparatus and a method for pumping a liquid, for example to recirculate liquid in a liquid storage tank by means of a gas lift pump. A perforated extension at the top of a lift portion of the gas lift pump described herein allows the apparatus to be used in circumstances where the depth of liquid in the tank may vary over a wide range. Gases other than air may be used in the gas lift, so as to change the acidity and the concentrations of dissolved gases, particularly oxygen, in the liquid. The gas may be introduced into the gas lift through a whistle that generates intense sound waves and couples them into the liquid. These features when used in combination have particular application against invasive species in the ballast water of ocean-going tankers.

Thus, some embodiments of the invention provide apparatus for simultaneously circulating liquid in a tank and changing a concentration of one or more dissolved gases in the liquid. Some embodiments provide apparatus for simultaneously circulating liquid in a tank, changing a concentration of one or more dissolved gases in the liquid and in addition exposing the liquid to intense sound waves.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A gas lift pump apparatus, comprising:
   a column having a substantially upright portion through which a liquid medium may be pumped by gas lift;
   a sonic energy generator positioned at a first location of the column and configured to generate sonic energy upon receiving a flow of a gaseous fluid, wherein the sonic energy is launched into the liquid medium in the column, wherein the gaseous fluid employed to generate the sonic energy is exhausted into the column thereby to pump the liquid medium through the column; and
   a bubble generator operable to provide gas bubbles in the liquid medium in the column, the apparatus being operable to subject the bubbles to the sonic energy generated by the sonic energy generator,
   wherein the column comprises a lift portion having a substantially continuous, unperforated wall and a perforated portion being a portion having a perforated wall, the lift portion of the column extending between the first location and the perforated portion of the column, and
   wherein the gaseous fluid exhausts from the sonic energy generator into the column such that the gaseous fluid rises through the lift portion a first distance before entering the perforated portion.

2. The apparatus of claim 1, wherein the sonic energy generator comprises a nozzle member operable to direct the flow of gaseous fluid into or across an entrance to a receptor member provided in a spaced apart relationship with the nozzle member, the receptor member defining an open cavity, thereby to excite resonance of gaseous fluid in the receptor member to generate the sonic energy.

3. The apparatus of claim 2, wherein the sonic energy generator is operable to communicate sonic energy into the liquid medium via a flexible diaphragm.

4. The apparatus of claim 3, wherein the diaphragm is arranged to resonate at a frequency corresponding to that of the sonic energy generated by the sonic energy generator.

5. The apparatus of claim 3, wherein the receptor member is mounted to the diaphragm thereby to couple sonic energy generated by the generator into liquid medium on an opposite side of the diaphragm.

6. The apparatus of claim 1, wherein gaseous fluid employed to generate sonic energy is arranged not to be injected into the column.

7. The apparatus of claim 1, wherein sonic energy generated by the sonic energy generator comprises ultrasonic energy.

8. The apparatus of claim 1, comprising a plurality of sonic energy generators.

9. The apparatus of claim 1, wherein the bubble generator comprises a constriction portion through which the liquid medium is forced to flow, the constriction portion having a converging section of reducing cross-sectional area, a throat section and a diverging section of increasing cross-sectional area.

10. The apparatus of claim 9, operable to inject gaseous fluid into liquid medium in the column at a location upstream of the constriction portion.

11. The apparatus of claim 9, operable to inject gaseous fluid into liquid medium in the throat section.

12. The apparatus of claim 9, arranged to provide a flow of the liquid medium into the constriction portion in the form of a vortex.

13. The apparatus of claim 11, arranged to generate a flow of liquid medium into the constriction portion in the form of a vortex by injecting a flow of liquid medium into the column of the apparatus in a direction substantially tangential to an inner surface of the column.

14. The apparatus of claim 1, arranged to generate microbubbles having a diameter in the range of at least one selected from amongst from around 1 micrometer to around 1000 micrometers, around 1 micrometer to around 500 micrometers, around 500 micrometers to around 1000 micrometers, and around 100 micrometers to around 1000 micrometers.

15. The apparatus of claim 1, further comprising a draw tube coupled to a base of the column, the draw tube extending in a direction away from a longitudinal axis of the column thereby to draw liquid into the column from a region away from the column.

16. The apparatus of claim 13, further comprising a draw tube coupled to a base of the column, the draw tube extending in a direction away from a longitudinal axis of the column thereby to draw liquid into the column from a region away from the column, wherein the draw tube is substantially normal to the column, and wherein the draw tube is arranged to allow the column to draw liquid therein in a direction substantially tangential to the inner surface of the column thereby to generate vortex flow in the column.

17. The apparatus of claim 1, wherein the fluid delivery device is operable to introduce a gas into the column thereby to reduce a concentration of one or more gases in the liquid.

18. The apparatus of claim 17, wherein the gas comprises carbon dioxide.

19. The apparatus of claim 17, wherein the gas comprises a gaseous mixture comprising carbon dioxide and nitrogen.

20. The apparatus of claim 17, wherein the gas comprises a gaseous mixture of carbon dioxide, nitrogen and oxygen.

21. A liquid storage tank comprising the apparatus of claim 1.

22. The tank of claim 21 in the form of a substantially L-shaped tank, wherein the column is provided in a leg portion of the tank and the draw tube extends into a foot portion of the tank laterally away from the leg portion.

23. A marine vessel comprising a ballast tank provided by the tank of claim 21.

24. A method of circulating a liquid medium comprising:
pumping the liquid medium through a column of a gas lift pump by means of gas lift whereby a flow of gaseous fluid is introduced into the column at a first location thereof;
allowing the gas to rise in the column through a lift portion of the column a first distance before entering a perforated portion of the column, the lift portion of the column being a portion having a substantially continuous, unperforated wall and extending between the first location and the perforated portion;
subjecting the liquid medium rising in the column to sonic energy, wherein the sonic energy is generated by a whistle device that receives the flow of gaseous fluid; and
providing gas bubbles in liquid in the column and subjecting the bubbles to the sonic energy.

25. A method of circulating a liquid medium comprising:
pumping the liquid medium through a column of a gas lift pump by means of gas lift whereby a flow of gaseous fluid is introduced into the column at a first location thereof;
allowing the gas to rise in the column through a lift portion of the column a first distance before entering a perforated portion of the column, the lift portion of the column being a portion having a substantially continuous, unperforated wall and extending between the first location and the perforated portion;
providing gas bubbles in the liquid medium in the column;
subjecting the liquid medium and the bubbles in the column to sonic energy, wherein the sonic energy is generated by introducing the gaseous fluid to a whistle device; and
exhausting into the column gaseous fluid that has been introduced to the whistle device thereby to cause the pumping of the liquid medium through the column.

* * * * *